(12) United States Patent
Sivert

(10) Patent No.: US 8,151,787 B1
(45) Date of Patent: Apr. 10, 2012

(54) SOLAR DEVICE CONTROL APPARATUS WITH DEVICE INTERCHANGEABILITY

(76) Inventor: Patrick Richard Sivert, Jewett, TX (US)

( * ) Notice: Subject to any disclaimer, the term of this patent is extended or adjusted under 35 U.S.C. 154(b) by 371 days.

(21) Appl. No.: 12/384,034

(22) Filed: Mar. 30, 2009

(51) Int. Cl.
*F24J 2/38* (2006.01)
(52) U.S. Cl. .................. 126/608; 126/681; 33/1 DD
(58) Field of Classification Search .................. 126/608, 126/681; 33/1 DD
See application file for complete search history.

(56) References Cited

U.S. PATENT DOCUMENTS

| | | | | |
|---|---|---|---|---|
| 4,696,285 A * | 9/1987 | Zwach | ............... | 126/604 |
| 5,617,843 A * | 4/1997 | Erwin | ............... | 126/681 |
| 6,974,904 B2 * | 12/2005 | Azzam et al. | ............... | 136/244 |
| 2002/0175881 A1 * | 11/2002 | Luoma et al. | ............... | 345/55 |
| 2007/0251132 A1 * | 11/2007 | Luoma et al. | ............... | 40/541 |

* cited by examiner

*Primary Examiner* — Kenneth Rinehart
*Assistant Examiner* — Jorge Pereiro

(57) ABSTRACT

An apparatus for supporting and aiming various solar devices. Includes a cradle assembly (70) with two tilt pivots (59) located on opposite sides for vertical adjustment, and a turntable (46) for horizontal adjustment. Both adjustments, required for aiming the device toward the sun, are accomplished simultaneously and instantly by steering a biaxial control arm (74) while sighting an aiming instrument (88). The instrument can be used for aiming the solar device either in a direct line or by using the novel aim-ahead indicia (101). An optional utility cart (140) is used for mobility. The cradle assembly locks in either a direct-fit solar device (226) or an adaptor box (110) that, in turn, latches to a standardizing interchange mount (122). The mount, along with a device mounting kit (FIG. 16D), converts various solar devices (FIGS. 2, 12B, 13, and 16E) from different manufacturers, to be utilized by the apparatus. A second embodiment (FIGS. 17A and 17B) sans tilt capability, also accepts solar devices attached to the interchange mount.

14 Claims, 17 Drawing Sheets

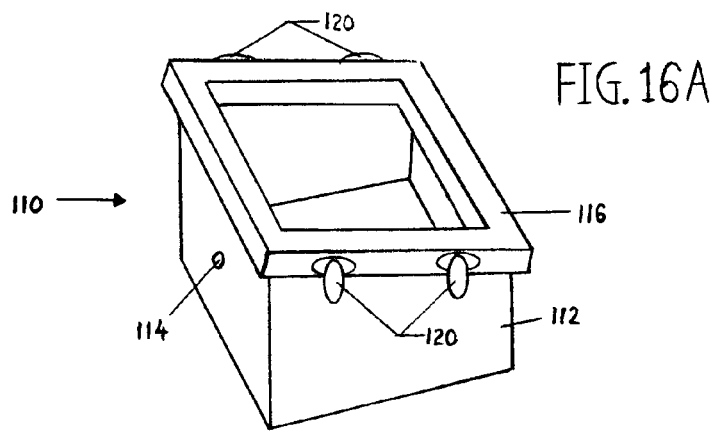
FIG. 16A
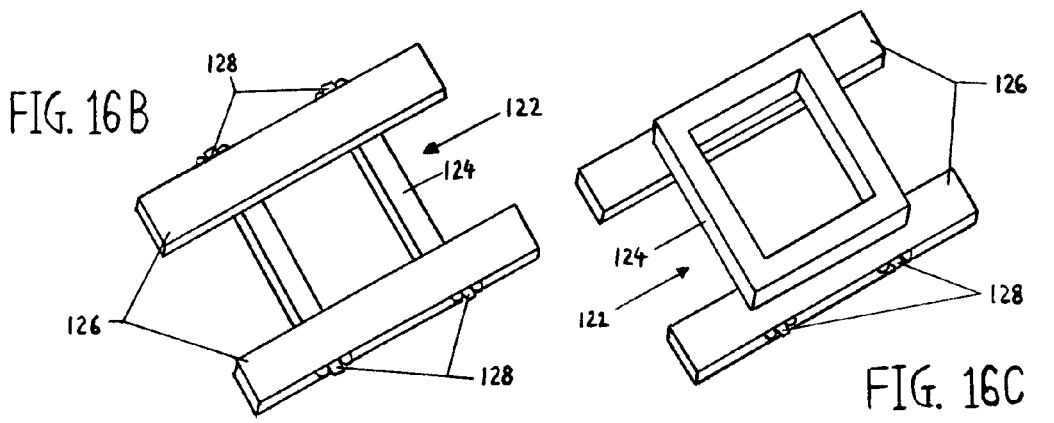
FIG. 16B
FIG. 16C
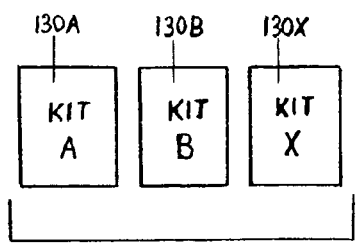
FIG. 16D
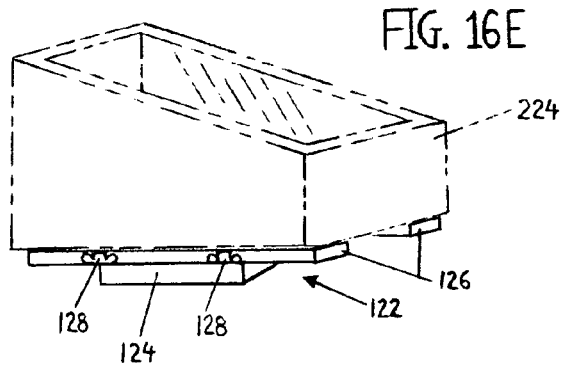
FIG. 16E

SOLAR DEVICE CONTROL APPARATUS WITH DEVICE INTERCHANGEABILITY

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field

This invention relates generally to solar powered devices such as ovens, parabolic cookers, water distillers, and food dehydrators, as well as small arrays of photovoltaic panels and the like, and in particular to the control of such solar devices by means of supporting and aiming them while having the option of exchanging the controlled device when desired.

2. Prior Art

In order to minimize the time required to complete any task using manually-aimed solar devices, quickness and accuracy in aiming the device to track the sun both vertically and horizontally should be maximized. Although many solar devices have no tilt adjustment, some do have adjustable reflectors or are propped up by using various materials. Solar devices such as the more expensive solar ovens and parabolic cookers generally have built-in gimbal systems for the cooking vessel to swivel on, so that the device can be vertically adjusted during the session by tilting it toward the sun.

Parabolic cookers require the most accurate and frequent aiming, typically every 15 to 30 minutes, and are powerful enough to fry foods. Solar ovens can be very powerful and on a bright sunny day in the summer they are capable of reaching 400+ degrees Fahrenheit and may reach 300+ degrees F. on a cool sunny winter day. For maximum output, solar ovens require aiming at least every 30 to 60 minutes. The aiming interval should be shortened (more frequent aiming) if the present weather conditions are hazy, partly cloudy, windy, or the power from the sun is diminishing as the day winds down.

While most solar ovens and parabolic cookers require tilt capability, solar food dehydrators and solar water distillers generally have built-in angled glazing for stationary operation (at least vertically) and usually do not require any type of prop or other fixture with tilt adjustment. One of the most popular solar ovens as discussed below comes equipped with its own adjustable tilt mechanism that the operator readjusts as needed during the session.

PRIOR ART DRAWING

Figure

FIG. 1 shows a perspective view from the side and rear of a state-of-the-art solar oven in operation, adjusted at its maximum vertical (tilted) position.

REFERENCE NUMERALS

| 201 | main body | 202 | rear leg |
| 203 | folding reflectors | 204 | upper frame |
| 205 | glass door | 206 | adjustment hole |

The solar oven of FIG. 1 is perhaps the world's best selling solar device and is manufactured by Sun Ovens International Inc. of Elburn Ill. and is currently sold under the registered trademark SUN OVEN®. The SUN OVEN® is very lightweight and has a rugged black plastic main body 201 mating to a sturdy upper frame 204. The oven chamber is accessible from the top through a hinged glass door 205. The hinged and folding reflectors 203 fold out instantly and are quickly locked in place. The rear leg 202 can be adjusted into any of nine different adjustment holes 206 to adjust tilt. Inside the oven chamber is a self-adjusting gimbal rack that can swivel up to approximately 80 degrees of tilt angle prior to contacting the glass door 205. Overall, the SUN OVEN® is an excellent solar device and is nearly perfect for camping or occasional household use. However, as the SUN OVEN® is used more frequently, the more apparent its shortcomings become.

To aim the SUN OVEN®, shown in FIG. 1, the operator must place the oven so that the shadows are even on both sides as viewed from either the front or rear of the oven. Then the oven must be tilted enough so that the shadows in the front and back of the oven chamber, as viewed from the top of the oven, are eliminated by adjusting the height of the rear leg 202. The operator must hold onto the upper frame 204 with one hand and twist and slide the rear leg 202 vertically until a spring-loaded button located on the rear leg 202 engages the desired adjustment hole 206. Overall, aiming is awkward since the operator must be near ground level and possibly in a kneeling position to adjust tilt while trying to keep from upsetting the oven and its contents. The aiming process should repeated at least every 30 to 60 minutes to minimize cooking time.

In addition to possibly tipping the oven over in the aiming process, the operator must be mindful of wind conditions, as the wind could catch the folding reflectors 203 causing the oven to tip. A strong gust of wind could cause a lot of damage to the reflectors 203 and along with upsetting the contents, could possibly cause the glass door 205 to be broken. Other problems include extreme glare from the reflected sunlight encountered during the aiming process while trying to minimize the shadows within the oven chamber. Another problem is the maximum tilt of approximately 60 degrees, which does not allow for anywhere near full vertical adjustment very early or very late in the day. Also, because the oven is near ground level, it is not easy to access and is not handy for loading and unloading the oven chamber. In addition, there is no place to set the food down so that the glass door 205 can be unlatched and opened while loading or closed and re-latched after unloading, especially if the cooking vessel requires handling by both hands.

As numerous as these disadvantages seem to be, they can all be overcome, and with some extra benefits added by simply removing the rear leg 202, and by using the appropriate control apparatus.

ADVANTAGES

While utilizing the primary embodiment of the control apparatus along with a utility cart and the solar oven such as that shown in FIG. 1, the aiming process takes just seconds as both the horizontal and tilt angles are simultaneously, precisely, and effortlessly adjusted. This saves time and takes the guesswork and effort out of the process of aiming the solar device. This in turn, can lead to minimized operating time because the aiming process is so quick, with the device most likely being better and/or more frequently aimed as a result. Because the control apparatus elevates the solar device well above ground level, it is much easier to access the target product(s). And when the utility cart is being used, there are flat surfaces available to set the target product(s) down on while loading or unloading the solar device. The control apparatus supports and locks the device in so that the device is safely secured aid will not tip over as a result of either wind gusts or aiming mishaps. Also, no direct sighting of the sun or reflected light is required during the aiming process. The maximum tilt can exceed 90 degrees, depending on ground clearance, allowing the solar device to gather more energy (a net energy gain) than normal, either very early or very late in the day.

Additional advantages of using the control apparatus along with any solar device that requires tilt, including that shown in FIG. 1, includes using the novel aim-ahead feature for more energy gain throughout the period that the solar device is in use. Aim-ahead leads to higher peak temperatures, higher ending temperatures, and therefore faster operating times than would otherwise be the case. Another advantage is that the utility cart allows for quick and easy shade avoidance as the shade canopy of any given area changes throughout the day, as well as seasonal changes. Another advantage is if the operator is finished using a particular solar device but has other solar tasks to be performed and other solar devices to perform them with, the solar device being used can be exchanged for another device. This is possible due to the use of a standardized mounting system for various solar devices and converting them to be interchangeable. The more total exposure of one or more solar devices, the greater the total energy gain. And, of course, since the cost of solar energy equals $0.00, the greater the total fossil fuel savings possible. In addition, further increases in the level of sustainability for any given household is achieved. Lastly, the primary embodiment can be quickly and easily disassembled into lightweight and easy to store subassemblies with no tools required.

An alternative embodiment has the advantages of being very simple and relatively less expensive. It is best used with the interchangeable and heavier type of solar devices that don't require tilt. Using solar devices such as distillers and dehydrators with this embodiment, allows the primary embodiment to remain free to be used with solar devices that do require tilt. If used with the optional caster cart, this embodiment is mobile, can be spun on its axis for horizontal adjustment, and can easily be rolled away from any encroaching shade.

These and other advantages of one or more aspects will become apparent from a consideration of the ensuing description and accompanying drawings.

SUMMARY

In accordance with one embodiment, the apparatus is comprised of a turntable with a fixed lower section and a rotatable upper section known as the rotor channel that interlocks with the base channel of the main body. Attached at the bottom of the base channel are two uprights rising on opposite sides. Near the top of each upright is a tilt pivot with each pivot having a threaded shaft passing through an upright and into the cradle assembly. The tilt pivots allow the apparatus to swivel in the vertical direction. Each pivot has an easy to set adjustable tensioner so that the cradle assembly, holding the controlled solar device, will maintain its adjusted position once set. At the back of the cradle assembly is a swinging lock-arm with an extended bolt that locks into either a direct-fit solar device or an adaptor box. The adaptor box allows other solar devices to be utilized. Also located at the back of the cradle assembly is the biaxial control arm that, when moved, adjusts the apparatus and cradle contents thereof, in both the vertical and horizontal directions simultaneously.

DRAWINGS

Figures

FIG. 1 see Prior Art section.

FIG. 16A is an elevated perspective view from the side and back of an adaptor box.

FIG. 16B is a perspective view from above of an interchange mount.

FIG. 16C is a perspective view from below of an interchange mount.

FIG. 16D represents a plurality of solar device mounting kits.

FIG. 16E shows a perspective view of a fixed-angle solar device mounted onto an interchange mount.

REFERENCE NUMERALS

| 0 | operator | 30 | control apparatus |
|---|---|---|---|
| 32 | bolt | 34 | locator dowel |
| 36 | lock nut | 38 | cam-lock |
| 43 | countersunk recess | 44 | bolt |
| 45 | washer | 46 | turntable |
| 47 | large washer | 48 | stabilizer spoke |
| 49 | bearing surface | 50 | stator |
| 50A | stator disk | 51 | lock nut |
| 52 | rotor channel | 53 | bottom recess |
| 54 | main body | 56 | base channel |
| 58 | upright | 59 | tilt pivot |
| 60 | pivot tensioner handle | 62 | washer |
| 64 | friction material | 66 | threaded plate |
| 70 | cradle assembly | 71 | cradle member |
| 73A | bolt | 73B | lock nut |
| 73C | washer | 74 | biaxial control arm |
| 75A | upper arm flange | 75B | lower arm flange |
| 76 | control handle | 77 | hinge bolt |
| 78 | engagement bolt | 82 | device lock-arm |
| 86 | lock nut | 88 | aiming instrument |
| 90 | cornice | 92 | orifice |
| 92A | orifice | 94 | upright |
| 96 | index plane | 97 | indicia |
| 99 | outer ring | 100 | bull's-eye |
| 101 | aim-ahead indicia | 102 | horizontal cross hair |
| 104 | vertical cross hair | 105 | common intercept |
| 106 | day segment track | 107 | aim-ahead indicator |
| 108 | aim-ahead minute mark | 109 | past minute mark |
| 110 | adaptor box | 112 | body |
| 114 | aperture | 116 | female flange |
| 120 | latch assembly | 122 | interchange mount |
| 124 | male flange | 126 | extendable surface |
| 128 | latching protrusion | 130A | device mounting kit |
| 130B | device mounting kit | 130X | device mounting kit |
| 131 | folding table | 132 | hinge |
| 133 | stop | 140 | utility cart |
| 142 | wheel | 143 | lag screw |
| 144 | swivel caster | 146 | deck |
| 146A | hole | 148 | removable handle |
| 149 | slot | 150 | handle stay |
| 152 | frame | 154 | axle |
| 156 | nut | 157 | lock washer |
| 158 | washer | 160 | lock nut |
| 170 | no-tilt solar device apparatus | 172 | leg |
| 174 | top member | 178 | caster cart |
| 180 | frame | 182 | deck |
| 184 | swivel caster | 186 | leg insert stay |
| 220 | solar parabolic cooker | | |
| 222 | mounted solar device | | |
| 224 | fixed-angle solar device | | |
| 226 | direct-fit solar device | | |
| 228 | photovoltaic array | | |

DETAILED DESCRIPTION

FIGS. 2 Through 16E—First Embodiment

Figure 1:
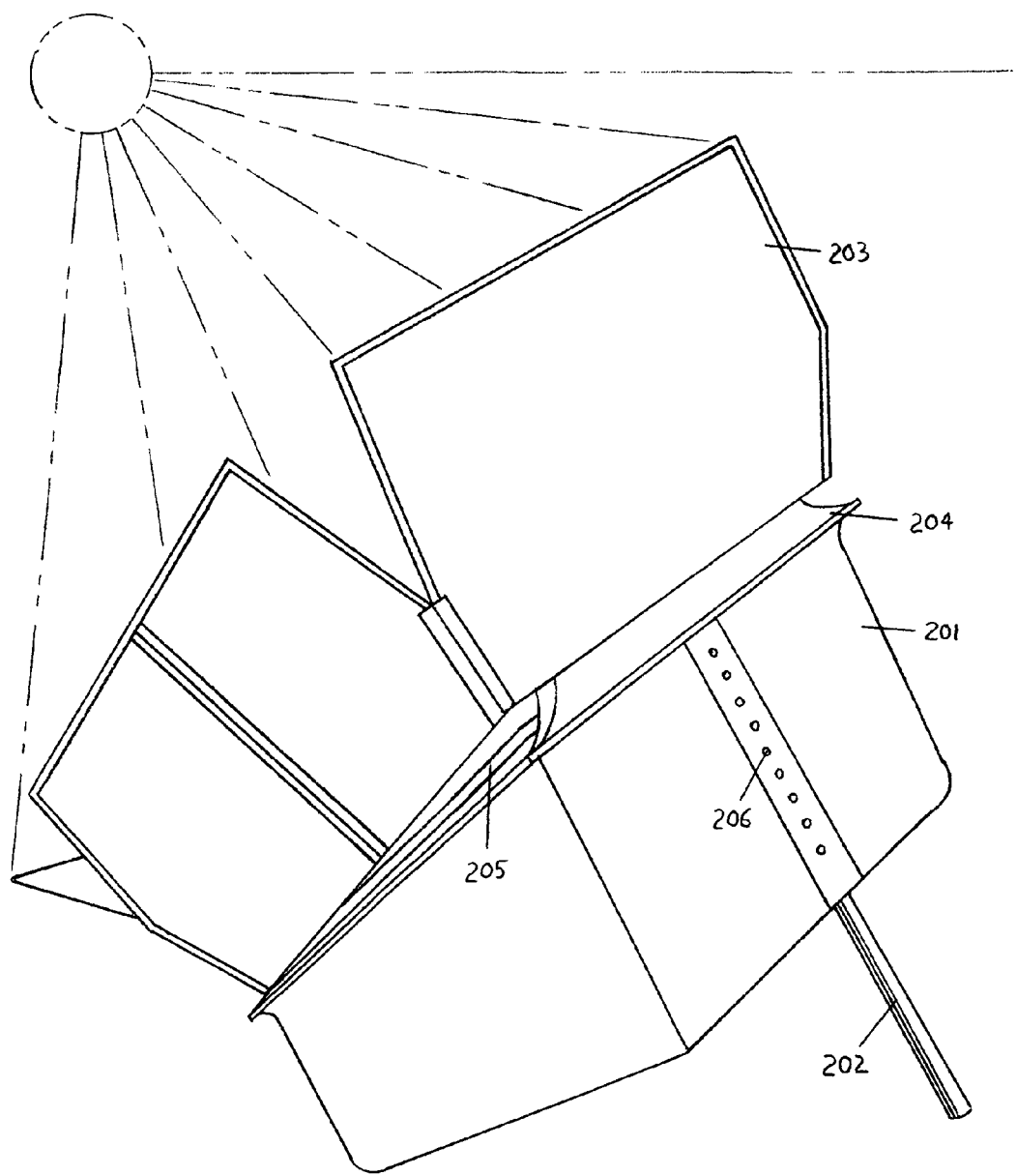
Figure 2:
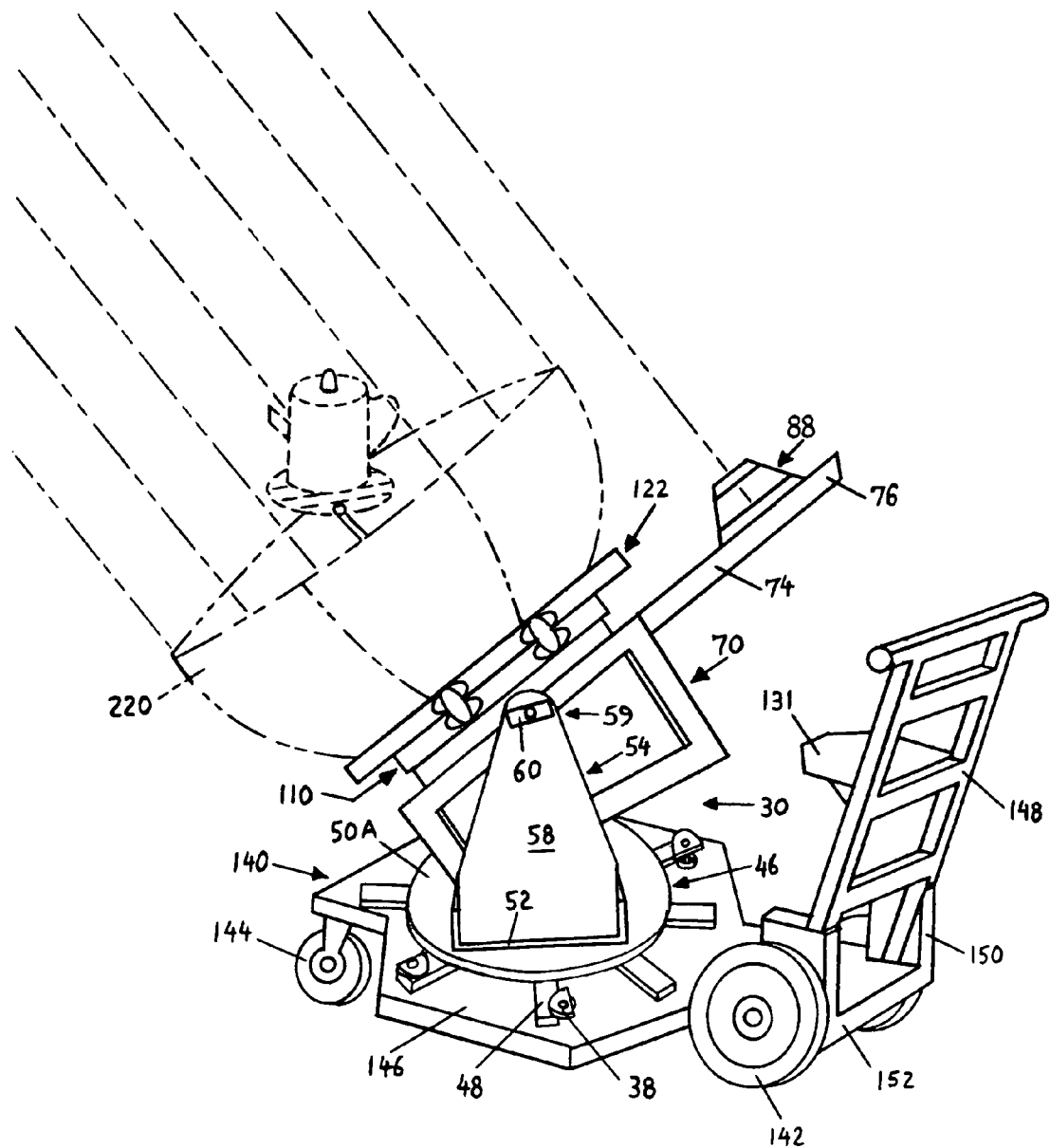
FIG. 2 is an environmental perspective view illustrating a control apparatus mounted on a utility cart and aimed at the sun with the control apparatus and solar device turned relative to the utility cart and shows a parabolic solar cooker in operation.
Figure 9:
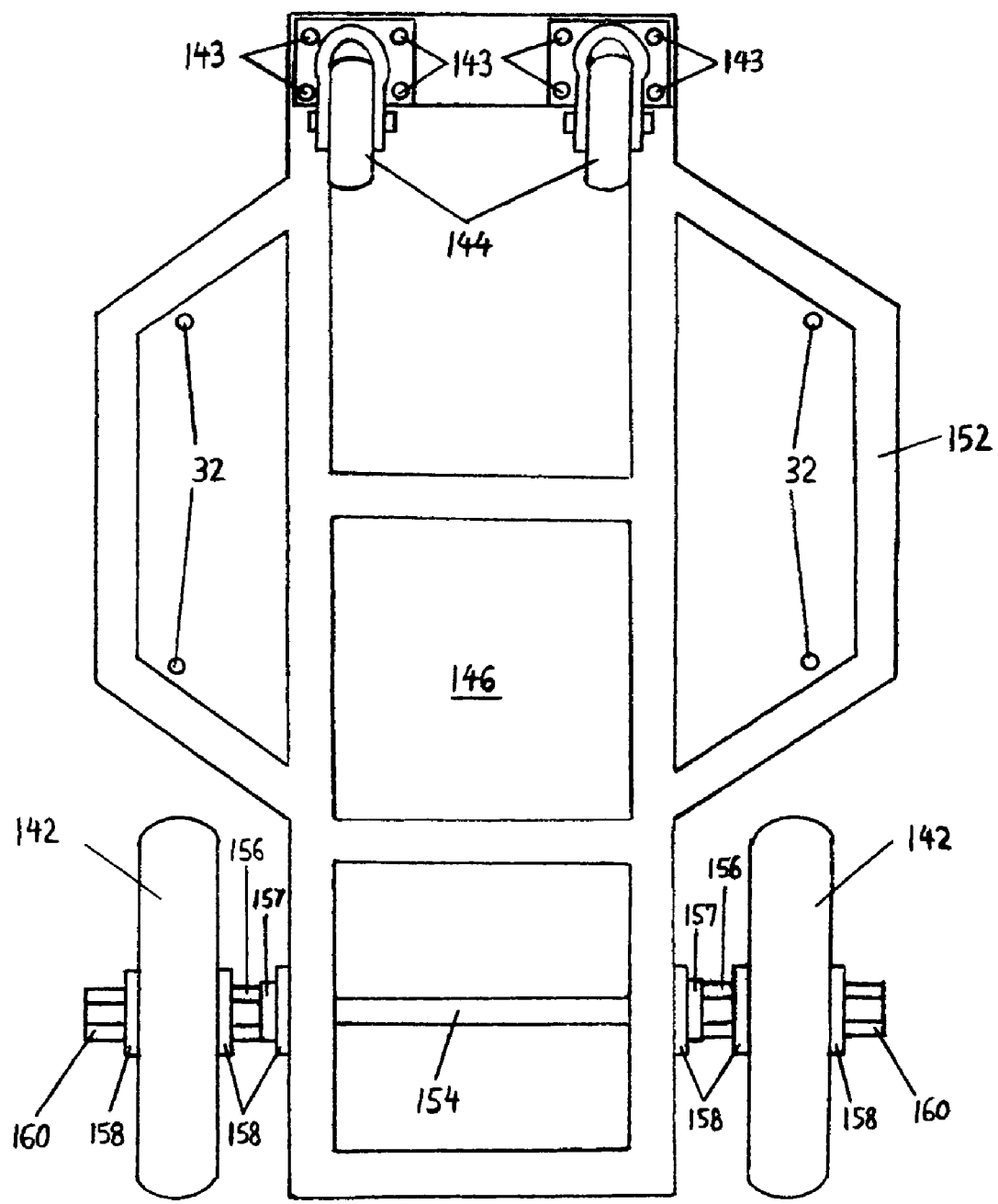
FIG. 9 shows a bottom view of the utility cart.
Figures 11A, 11B:
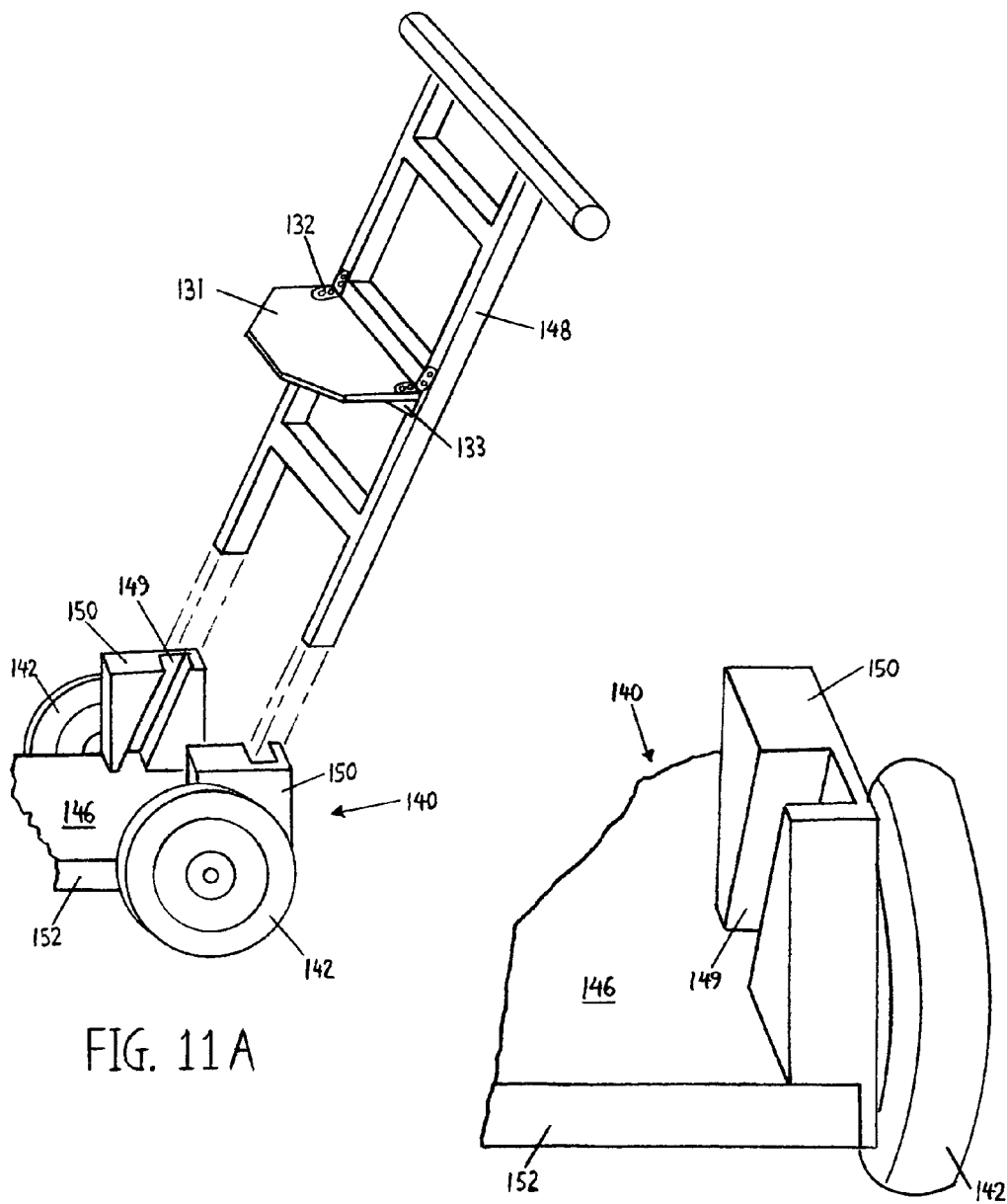
FIG. 11A is an elevated side view of a broken section of the utility cart illustrating the sliding removable handle. The point of insertion is shown with projection lines.
FIG. 11B shows a rear elevated broken section of the right handle stay and wheel of the utility cart.

With general reference to the listed Figs., a solar device control apparatus 30 with device interchangeability is described. As FIG. 2 shows, the control apparatus 30 has been placed onto an optional utility cart 140 that is comprised of a frame 152 onto which a deck 146 is mounted on top. On the underside of the frame 152, are swivel casters 144 mounted as shown in FIG. 9, along with the rear wheels 142. FIG. 2 shows handle stays 150 that hold a removable handle 148 that slides into place. A hinged table 131 is attached to the handle 148 as shown in FIG. 11A. Mounted on the upper surface of the deck 146 of the utility cart 140 of FIG. 2, are several cam-locks 38 shown sandwiching a number of stabilizer spokes 48 of a turntable 46 to the deck 146. The turntable 46 is the bottom subassembly of the control apparatus 30. On top of a stator disk 50A sits a pivotably attached rotor channel 52. Two uprights 58 form part of a main body 54 that interlocks with the rotor channel 52. Near the top of each upright 58, there is a tilt pivot 59, also shown in FIGS. 5 and 6. The shaft of each tilt pivot 59 passes through the upright 58 and is attached at the inner surface of a cradle assembly 70. On the back member of the cradle assembly 70 shown in FIG. 2, and attached on the same plane with the top of the cradle assembly 70, is a biaxial control arm 74. At the opposite end of the biaxial control arm 74 is a control handle 76 located just beyond an aiming instrument 88. FIG. 2 also shows the cradle assembly 70 supporting an adaptor box 110. Latched to the upper portion of the adaptor box 110, is an interchange mount 122. On the top surface of the interchange mount 122 is a mounted solar parabolic cooker 220 that is attached to the mount 122 by using a device mounting kit 130X represented in FIG. 16D.

Figure 3:
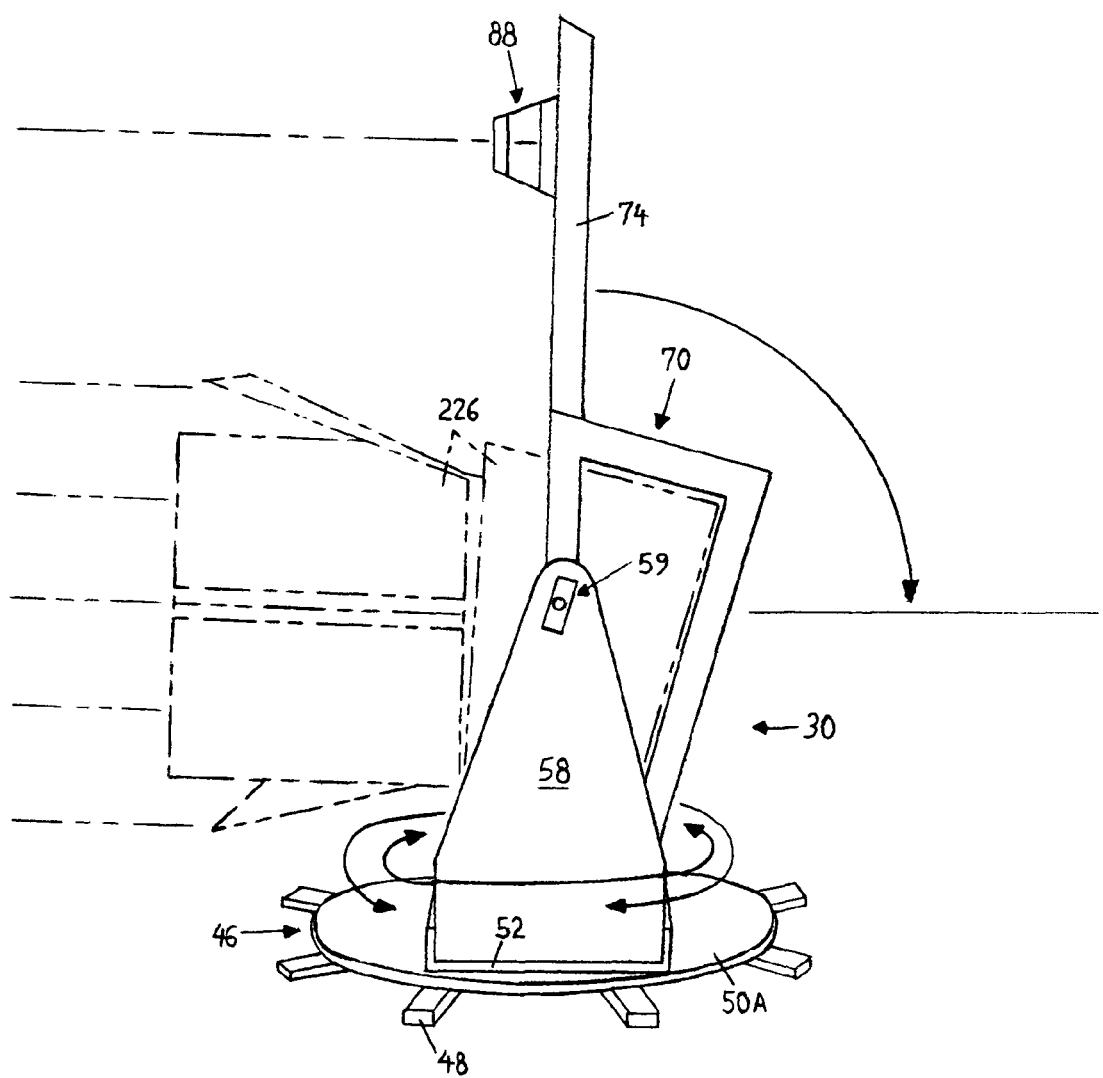
FIG. 3 is a side view of the control apparatus without the utility cart and operating with a direct-fit solar device tilted at the horizon with near maximum tilt and with direction arrows showing 90 degree tilt and 360 degree horizontal movement capability.

FIG. 3 shows the control apparatus 30 being used without the utility cart 140. The turntable 46 is sitting directly on the ground with the stabilizer spokes 48 forming a broad-based foundation and keeping the upper portion of the stator disk 50A off of the ground. The direction arrows around the upright 58 represent 360 degree horizontal movement in both directions for the entire apparatus from the rotor channel 52 on up. The cradle assembly 70 is tilted near its 90+ degree maximum as shown by the direction arrow. As FIG. 3 also shows, the biaxial control arm 74 is vertical, with the aiming instrument 88 aimed at the horizon, as is a direct-fit solar device 226. Only when a device of the same dimensions as the direct-fit solar device 226 is used, an adaptor box 110 and interchange mount 122 are not needed.

Figure 4:
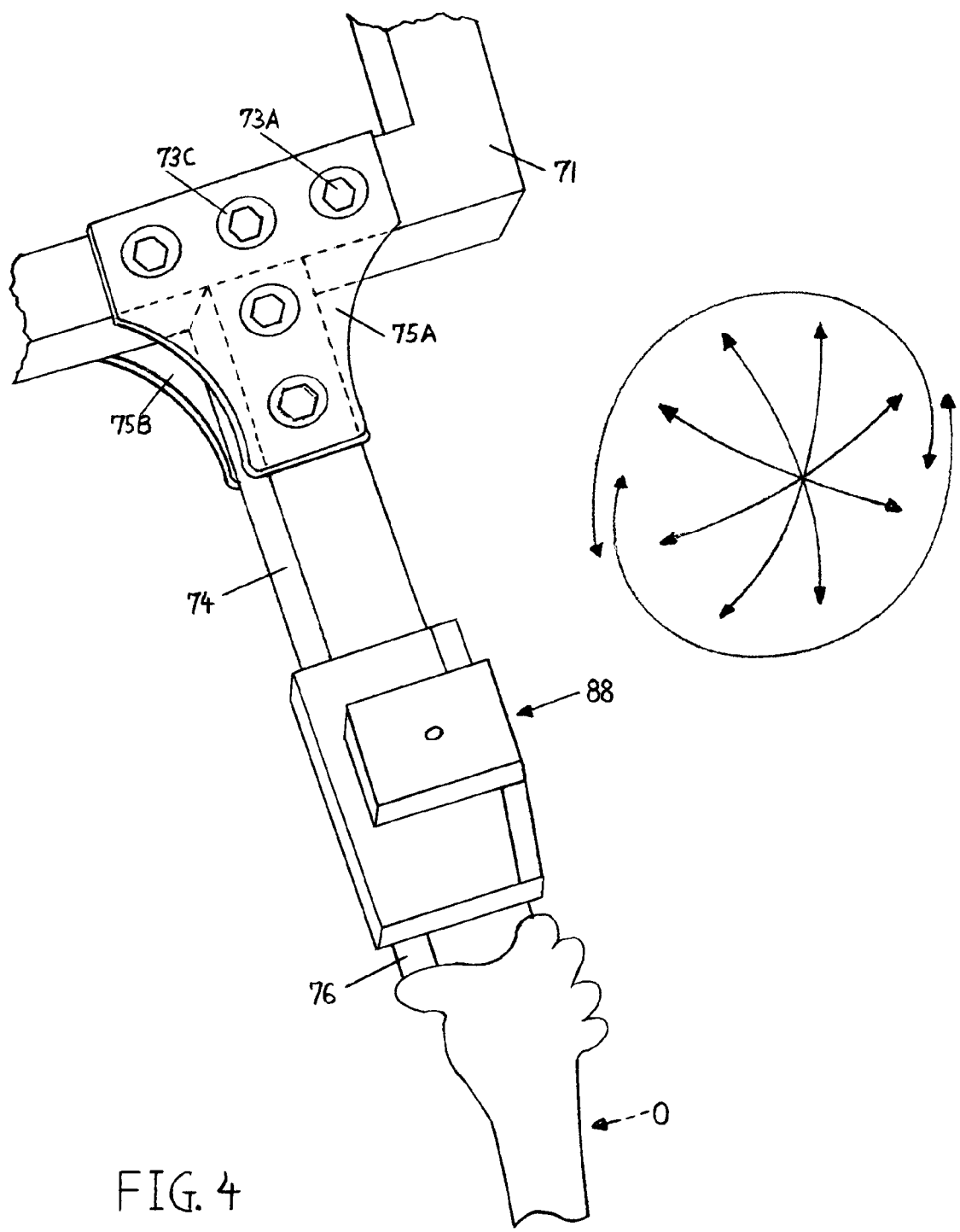
FIG. 4 shows a rear perspective view from above with a broken section of a cradle member flanged to the biaxial control arm onto which an aiming instrument is attached near the operator's hand. Direction arrows illustrate the wide range of movement possible for the biaxial control arm.

FIG. 4 shows an operator 0 grasping the control handle 76 at the end of the arm 74. The aiming instrument 88 is mounted in front of the handle 76. The arm 74 and a cradle member 71 are sandwiched between an upper arm flange 75A and a lower arm flange 75B with the arm 74 being mounted perpendicular to the back of cradle member 71. The current version uses five bolts 73A, each fitted with a washer 73C prior to insertion into the flange 75A. Three of the five bolts 73A pass through the cradle member 71 and the flange 75B. The other two bolts 73A pass through the arm 74 and flange 75B. On the underside of flange 75B, each of the five bolts 73A is fitted with both washers 73C (not shown) and lock nuts 73B (not shown). The FIG. 4 direction arrows indicate the range of motion possible for the biaxial control arm 74 by the operator's 0 movement.

Figure 5:
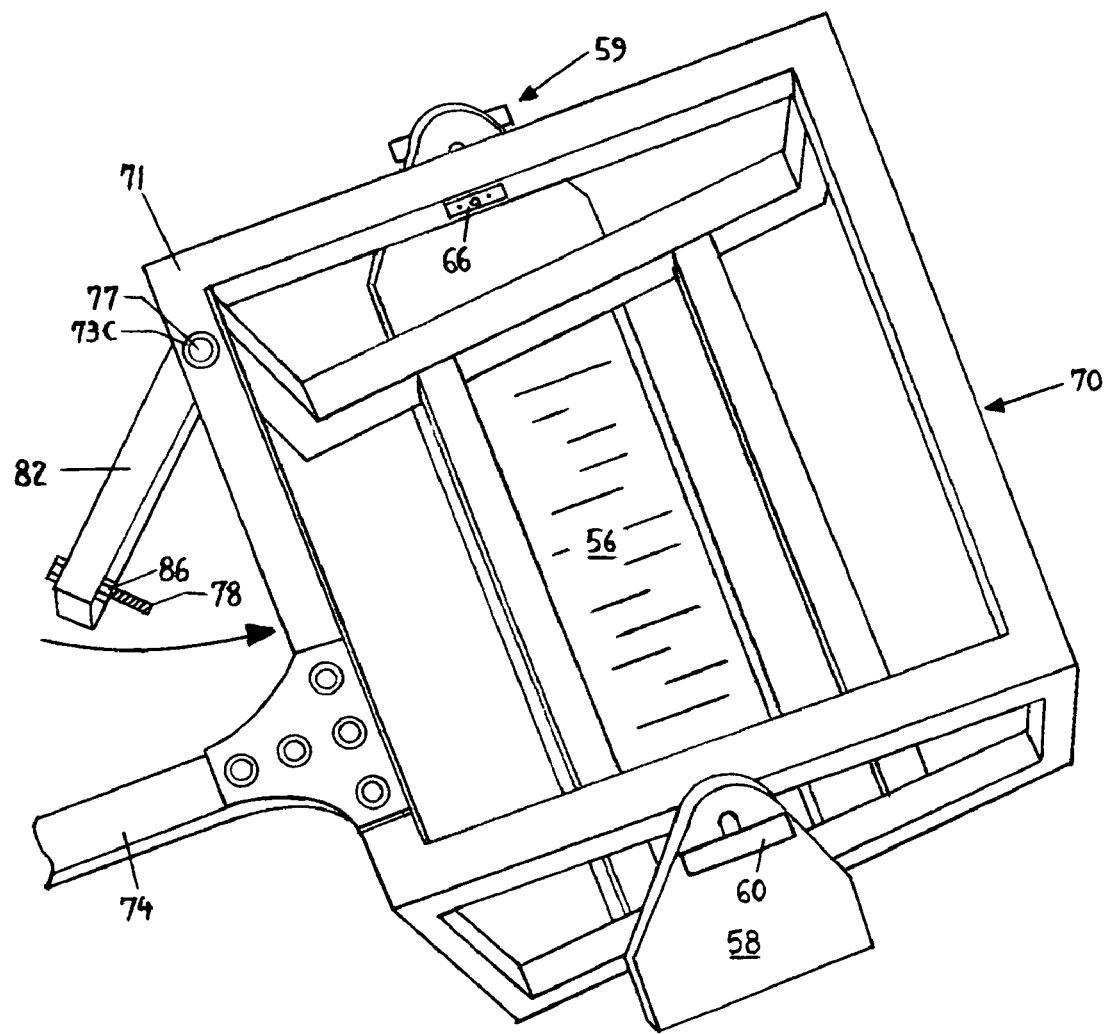
FIG. 5 shows a perspective side view from above of the control apparatus with an empty cradle assembly and an open device lock-arm. For clarity, the turntable is not shown at the bottom of the apparatus.
Figure 12A:
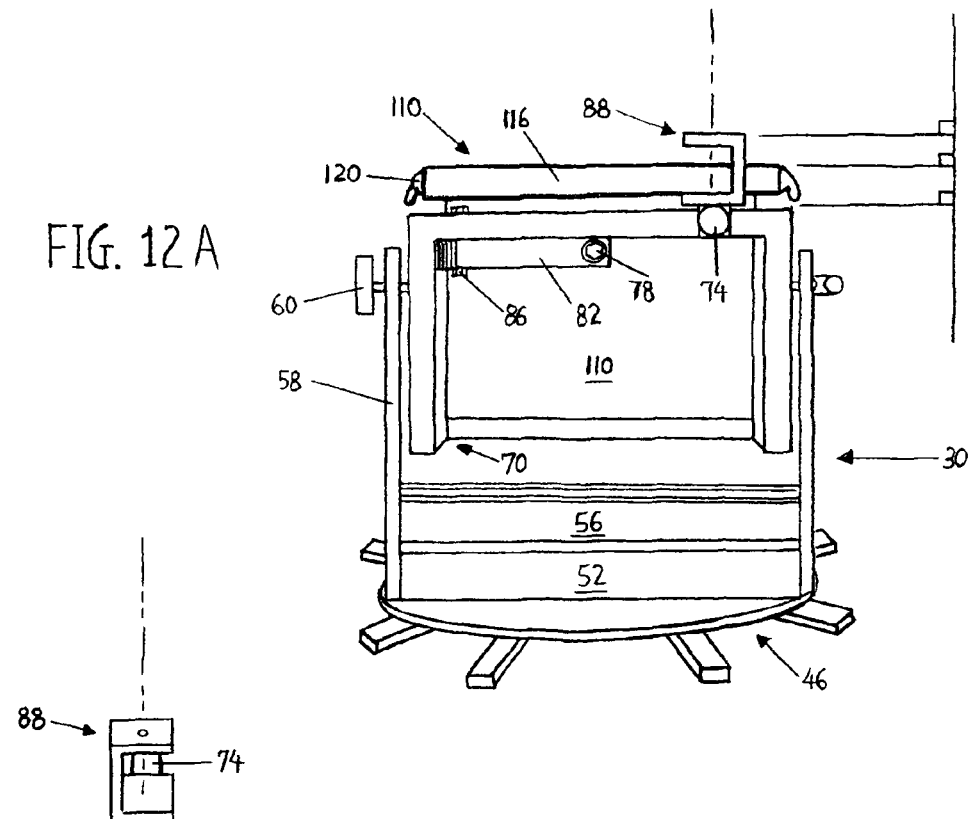
FIG. 12A is a rear view of a control apparatus with a slightly tilted cradle assembly holding an adaptor box with the device lock-arm engaged and also shows the parallel lines formed by the top surfaces of the biaxial control arm, the aiming instrument, and the adaptor box.

FIG. 5 is showing an empty control apparatus 30, without turntable 46 installed, for clarity. The cradle assembly 70 is connected pivotably to uprights 58 by tilt pivots 59, ending on the outside of assembly 70 with the adjustable pivot tensioner handles 60. The uprights 58 are connected near the bottom to base channel 56 by screws (not shown). In FIG. 5, the base channel 56 extends the full length between the uprights 58, and is visible through the bottom of assembly 70, and as shown in FIG. 8B. As FIG. 5 shows, a device lock-arm 82 is in the open position with an engagement bolt 78 protruding toward the cradle assembly 70. The bolt 78 is inserted through a washer 73C (not shown), inserted through the lock-arm 82 and inserted through another washer 73C (not shown), and the bolt 78 is held in place by a lock nut 86. The lock-arm 82 is mounted flush to the underside of the back cradle member 71 by a hinge bolt 77 inserted through the washer 73C, inserted through the cradle member 71, inserted through another washer 73C (not shown), inserted through the lock-arm 82, inserted through another washer 73C (not shown), and is fastened on the underside by lock nut 86, as shown in FIG. 12A. The engagement bolt 78 engages an aperture 114 located centrally in the back of the device or the adaptor box 110 to be held in place. The outer surface of the lock-arm 82 near the hinge bolt 77 is rounded, as shown in FIG. 12A. The rounded edge allows the lock-arm 82 to operate freely as well as to be of maximum length and of minimum engagement angle. In FIG. 5, a broken section of the arm 74 is shown for reference.

Figure 6:
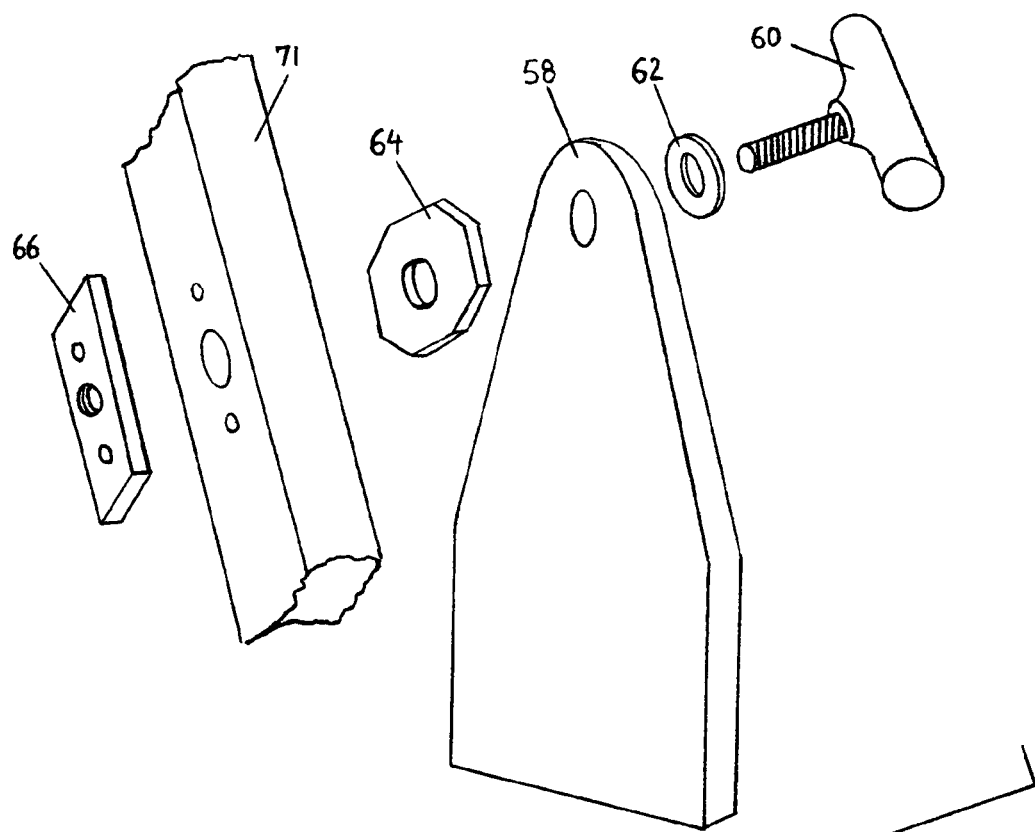
FIG. 6 is a perspective exploded view of a tilt pivot and shows a main body upright and a broken section of a cradle member.

FIG. 6 shows an exploded view of the tilt pivot 59 that is comprised of the pivot tensioner handle 60, of which the threaded portion is inserted through a washer 62, inserted through a clearance hole near the top of the upright 58, inserted through friction material 64, inserted through a clearance hole in cradle member 71 (shown in FIG. 6 as a broken section), and screwed into a threaded plate 66. The threaded plate 66 is attached to the member 71 by screws (not shown). One tilt pivot is required for each side of the cradle assembly 70. The clearance hole in assembly 70 is positioned fore and aft such that the center of gravity is biased toward the rear of the assembly 70 when the assembly 70 is empty. The friction material 64 allows for an adjustable sliding contact between the upright 58 and the member 71 for each tilt pivot 59. Each piece of friction material 64 is made from an approximately 3 mm×50 mm×50 mm piece of reinforced hydraulic hose rubber that was cut from typical industrial stock, although other suitable materials may be used.

Figure 7:
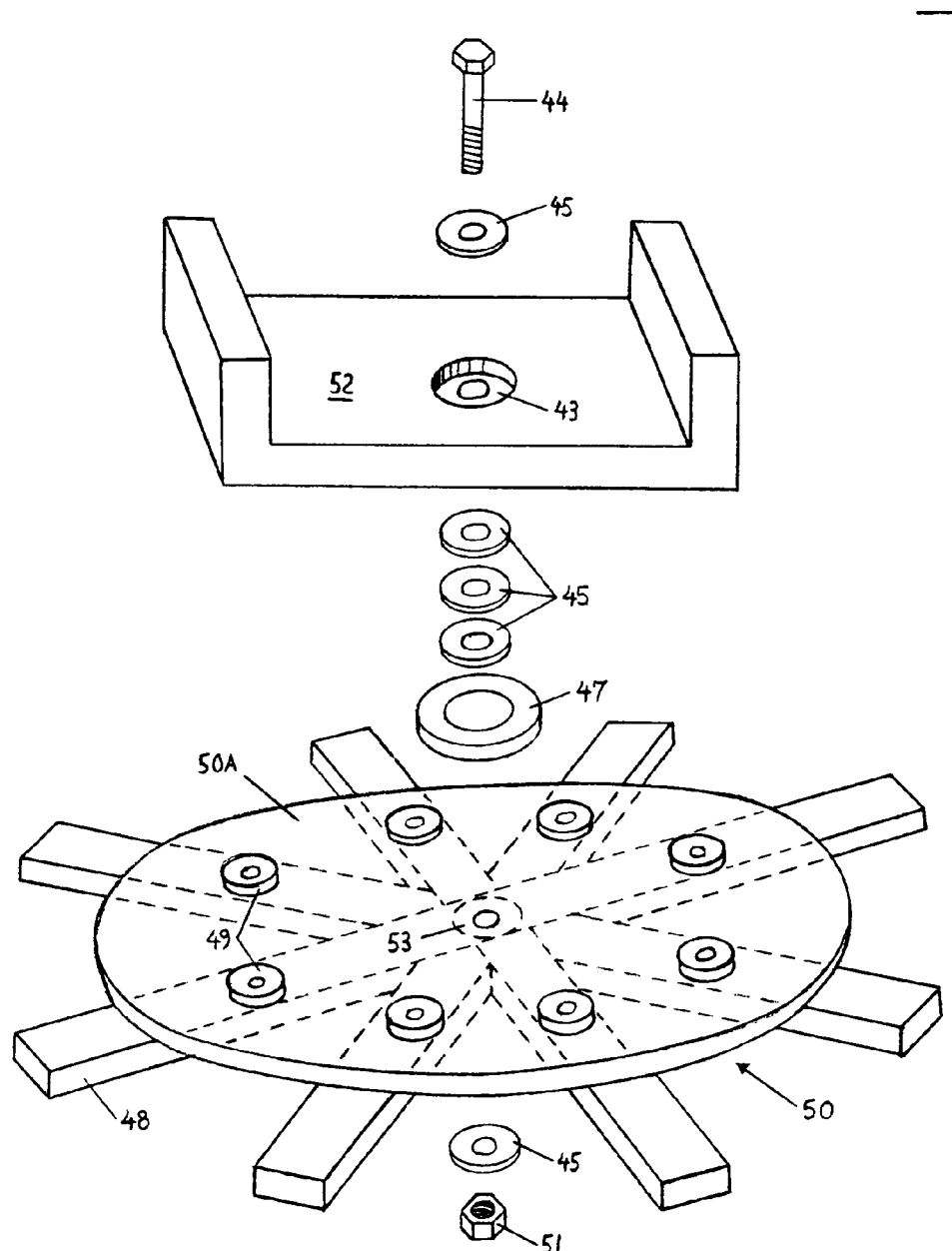
FIG. 7 shows an elevated exploded view of the turntable.
Figure 8A:
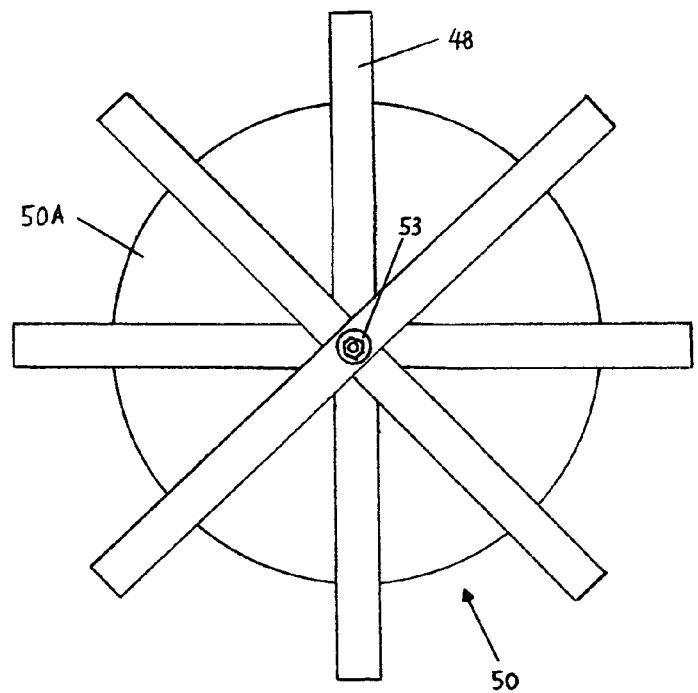
FIG. 8A shows a bottom view of the turntable stator.
Figure 8B:
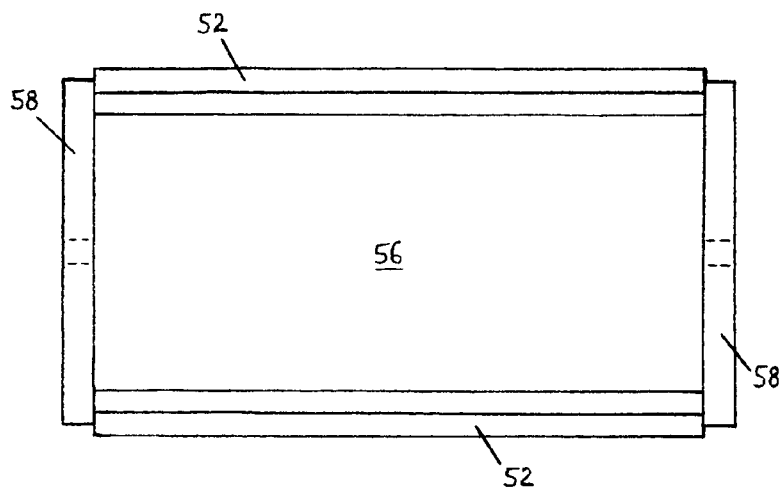
FIG. 8B is a plan view that shows the interlocking between a bare rotor channel and a bare main body, parts removed for clarity.

As shown in FIGS. 7 and 8A, the stabilizer spokes 48 are attached radially at even angles to the underside of the stator disk 50A by screws (not shown). The rotor channel 52 has a countersunk recess 43 shown in FIG. 7, centered on the top surface of the rotor channel 52, and drilled with a clearance hole for bolt 44 passing on through the bottom of the rotor channel 52. The countersunk recess 43 must be at least deep enough for the head of the inserted bolt 44 and a washer 45 to fit flush with the top of the rotor channel 52. Stator 50 has a bottom recess 53 centered and drilled into the bottom with a clearance hole for bolt 44 passing through the stator disk 50A. The bottom recess 53 of FIG. 8A must be at least deep enough for washer 45 and a lock nut 51 to fit flush with the bottom of the stabilizer spokes 48 of the stator 50. On the upper side of the stator 50 in FIG. 7, bearing surfaces 49 are affixed to the stator disk 50A either by screws (not shown) or bonded to the surface. The bearing surfaces 49 are placed so that the load on each bearing surface 49 has support from the underlying stabilizer spokes 48 beneath the stator disk 50A, as shown by the hidden lines of FIG. 7. Each bearing surface 49 is placed radially outward from the center of the stator disk 50A such that the outer edge formed by the bearing surfaces 49 placed in a circle measures less distance than the narrowest measurement from the center to the edge of the rotor channel 52. A large washer 47 is placed in the center of the stator disk 50A and a plurality of washers 45 are placed within the center of the large washer 47 and stacked atop each other until the stack of washers 45 is at least as thick as the thickest bearing surface 49. The large washer 47 and all washers 45 are held in place for assembly by the application of a thick lubricant such as axle grease (not shown), which is also applied to each surface 49. The lubricant allows the surfaces 49 to slidably contact the lower surface of the rotor channel 52 with much less friction than without the lubricant. As shown in FIG. 7, to assemble turntable 46, bolt 44 is inserted through one washer 45, and into and through the countersunk recess 43 of the rotor channel 52. The channel 52 is placed with the bolt 44 in line with the stack of washers 45 and the large washer 47 on the stator disk 50A. The bolt 44 is pushed on through and into the bottom recess 53 of the stator 50. From the bottom of the stator 50, another washer 45 is placed onto the bolt 44 and secured with the lock nut 51.

FIG. 8B shows the interlocking of the rotor channel 52 with main body 54. The main body 54 is comprised of the base channel 56 and two uprights 58, with one upright 58 attached at each end of the base channel 56. The hidden lines of FIG. 8B indicate the location of the tilt pivots 59. Also not shown in FIG. 8B, is the stator 50 of the turntable 46 and the cradle assembly 70, for clarity.

FIG. 9 shows the underside of the utility cart 140 with the frame 152 attached to the deck 146 by screws (not shown). At each front corner of the frame 152, swivel casters 144 are mounted by lag screws 143, with each lag screw 143 being fit with a conventional lock washer (not shown). The distance from the ground for installing the axle 154 is determined so that the deck 146 is level from front to back. The axle 154 is also located just far enough toward the rear of the utility cart 140 so that there is ample clearance between the wheels 142 and the frame 152 section over which the turntable 46 is placed. The frame 152 is drilled on a centerline through both sides with a clearance hole, allowing the shaft of axle 154 to be inserted and assembled as shown in FIG. 9. Once the axle 154 is inserted and centered, on each side of the axle 154, a washer 158 is placed, followed by a lock washer 157, and a nut 156. After tightening nut 156, another washer 158 is placed on axle 154, followed by a wheel 142, another washer 158, and finally a lock nut 160. FIG. 9 also shows four bolts 32 protruding through the deck 146 from the underside of the utility cart 140. The bolts 32 are arranged in a pattern necessary to center the turntable 46 onto the upper surface of the deck 146. The centering of the turntable 46 both side-to-side as well as fore and aft is accomplished through the interaction of locator dowels 34 and the stabilizer spokes 48 of the turntable 46, as shown in FIG. 10B.

Figure 10A:
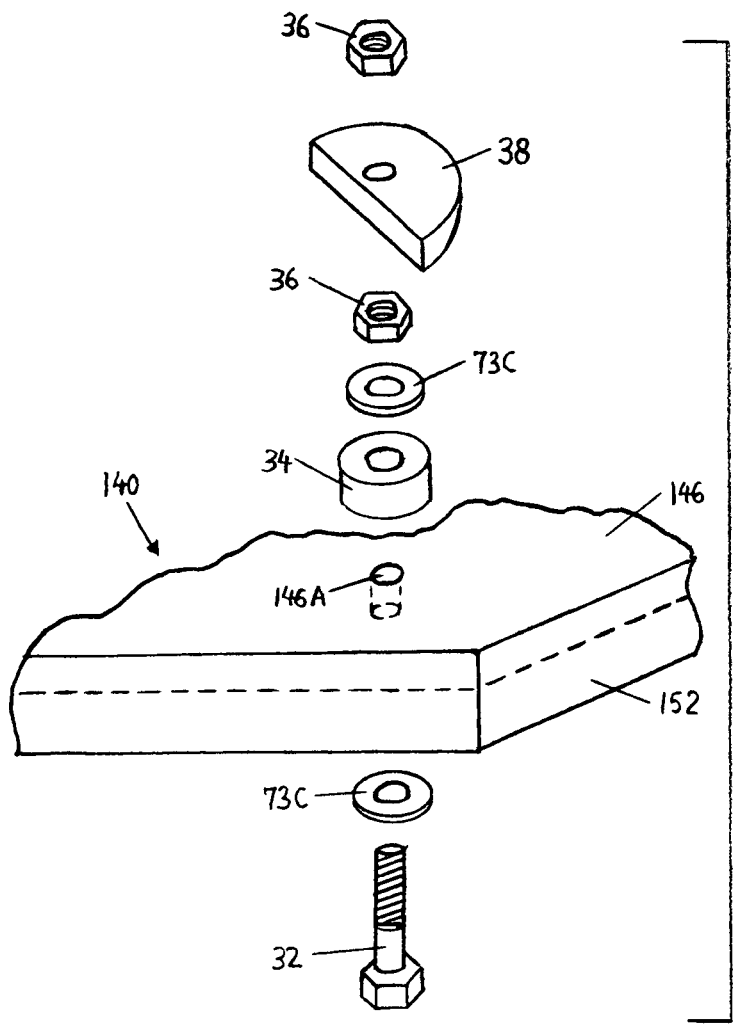
FIG. 10A is an exploded view of a cam-lock and locator dowel assembly, showing a broken section of the utility cart deck.
Figure 10B:
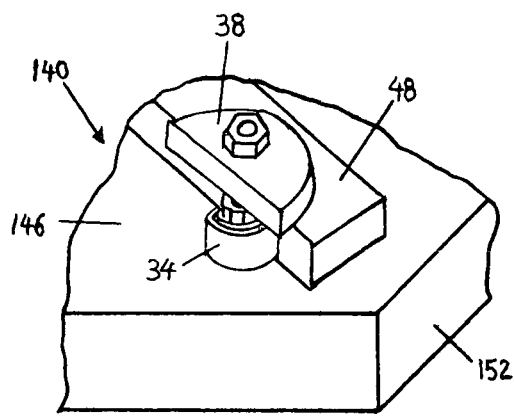
FIG. 10B is an elevated view of a broken section of a utility cart showing the interaction between the locator dowel, the utility cart deck, the cam-lock, and one of the turntable's stabilizer spokes.
Figure 10C:
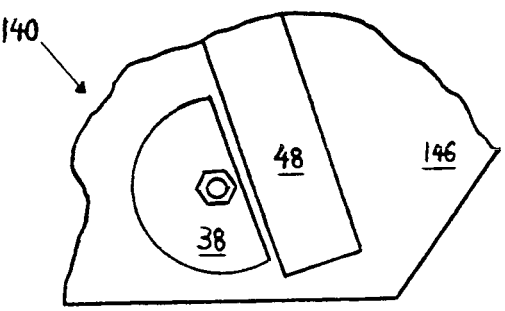
FIG. 10C is a plan view showing a broken section of the utility cart deck with an open cam-lock assembly.

FIG. 10A shows an exploded view of an assembly containing the cam-lock 38. To assemble the cam-lock 38, the washer 73C is placed on the bolt 32, which is then inserted through the hole 146A in the deck 146 from the underside and the locator dowel 34 is placed on the bolt 32 from the topside. Another washer 73C is placed on the bolt 32, then a lock nut 36 is placed on the bolt 32, and tightened. The cam-lock 38 is then placed on the bolt 32, followed by, finally, another lock nut 36. In FIG. 10B, the cam-lock 38 is shown in the engaged position, turned one-half turn or so, sandwiching the stabilizer spoke 48 of the turntable 46 between the deck 146 and the cam-lock 38. In FIG. 10C, the cam-lock is in the open (unlocked) position as the stabilizer spoke 48 of turntable 46 is automatically situated by the locator dowels 34 on the deck 146. All cam-locks 38 are open when the turntable 46 is placed onto or removed from the deck 146.

FIG. 11A is showing a broken section of the utility cart 140 and the insertion of the removable handle 148 into a slot 149 located on each handle stay 150. Each handle stay 150 is located near the rear on each side of the utility cart 140, and is attached to the frame 152 by screws (not shown). The removable handle 148 is placed into the slots 149 of both handle stays 150 simultaneously with the removable handle 148 slidably contacting the handle stays 150 until bottoming-out on the surface of the deck 146. The broken view of FIG. 11B shows the position of the stay 150 in relation to the frame 152 and deck 146 with a lengthwise view of the slot 149. FIG. 11A also shows the folding table 131 pivotably mounted on each side with a hinge 132 attached to the removable handle 148 by screws (not shown). The folding table 131 is limited in downward travel to a horizontal orientation by a stop 133, attached to each side of the folding table 131 by screws (not shown).

Figure 12B:
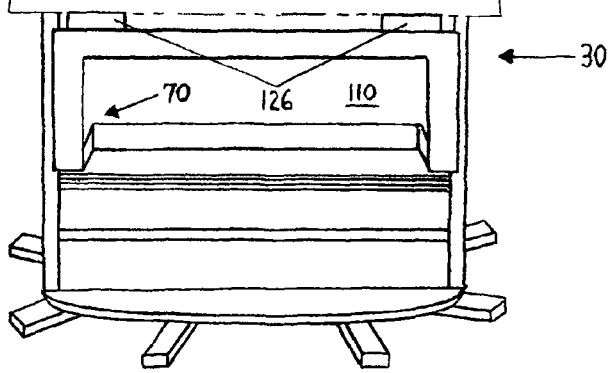
FIG. 12B shows a front view of an aimed control apparatus controlling a small photovoltaic array angled vertically toward the sun.
Figure 13:
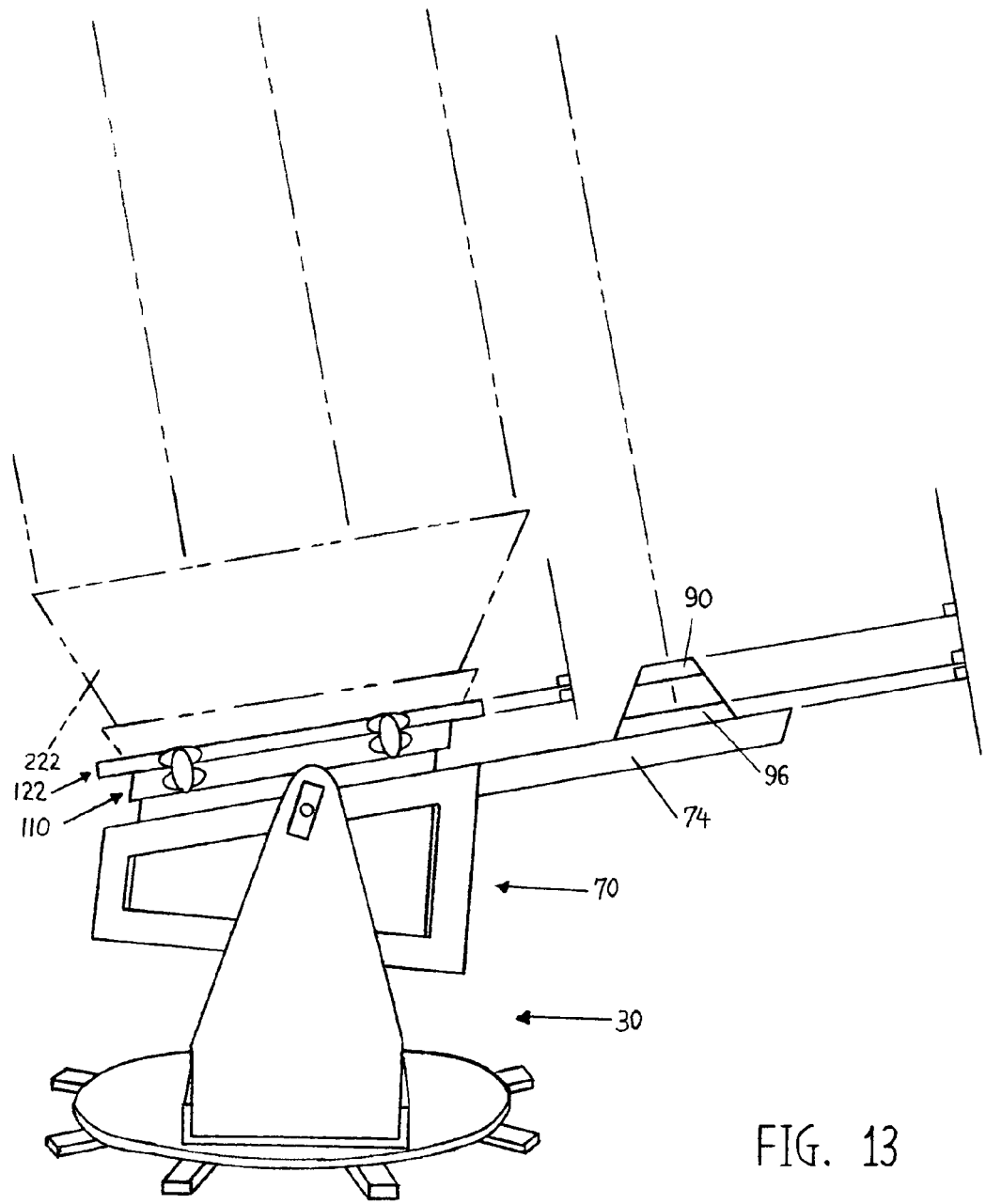
FIG. 13 shows a side view of the control apparatus with a solar device aimed toward the sun and the parallel lines formed by the aiming instrument, the cradle assembly upper surface, the adaptor box, the interchange mount, and the solar device.

FIGS. 12A and 13 show a control apparatus 30 without the utility cart 140, highlighting the importance of parallel planes for the proper alignment of the aiming instrument 88. FIG. 12A is showing a view from the rear of apparatus 30, and the side-to-side parallel lines formed by the upper surface of the biaxial control arm 74 onto which the aiming instrument 88 is mounted. Other parallel lines shown are formed by the top surfaces of both the aiming instrument 88 and the adaptor box 110. FIG. 12B shows a front view of the apparatus 30 supporting an aimed solar photovoltaic array 228. FIG. 13 is showing a side view of the apparatus 30 and the parallel lines from front to rear of apparatus 30 formed by the top surfaces of the cradle assembly 70 with the arm 74. Other parallel lines shown are formed by the top surfaces of a cornice 90 and an index plane 96 of the aiming instrument 88, as well as the top surface of the adaptor box 110, and the upper surface of the interchange mount 122.

Figure 14A:
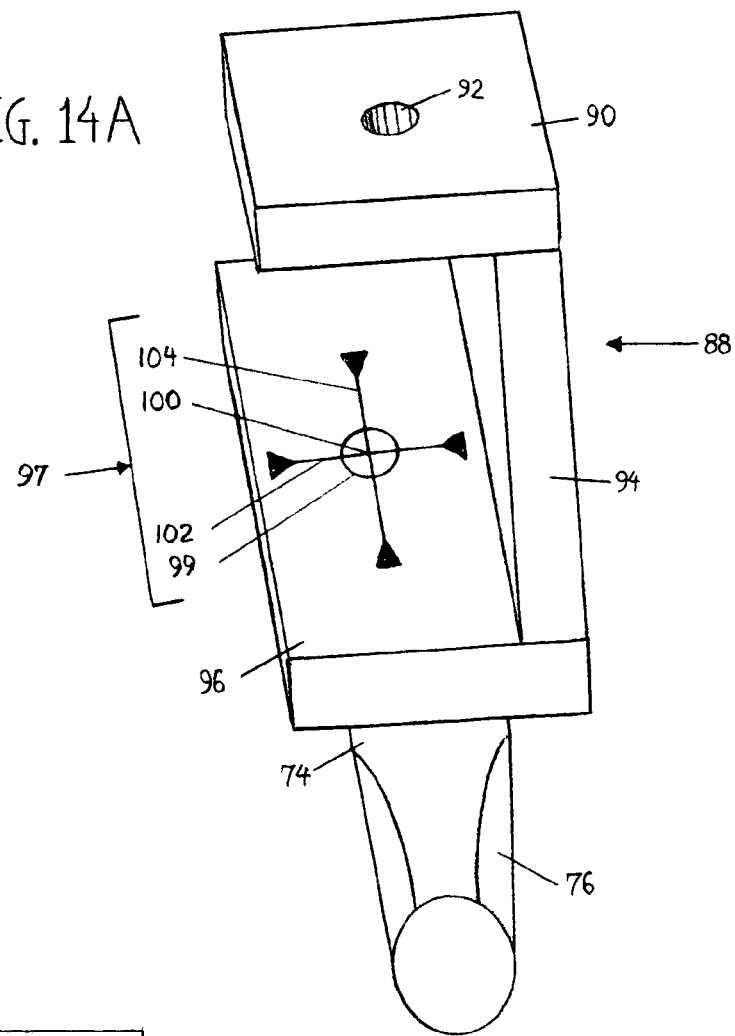
FIG. 14A is an elevated perspective view from the operator's position of an aiming instrument mounted on the biaxial control arm with the aiming instrument's index plane showing some indicia details. The details shown are used for direct aiming.
Figure 14B:
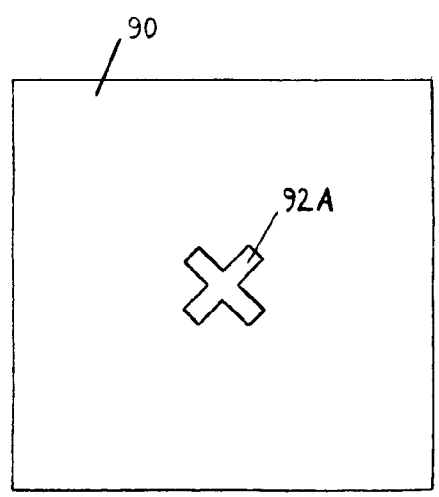
FIG. 14B is a plan view of an alternative orifice for the aiming instrument.

FIG. 14A shows the aiming instrument 88 from the operator's 0 position as sighted from the end of the control handle 76 and showing the direct-aim details of indicia 97. The index plane 96 of the instrument 88 is attached to the arm 74 by screws (not shown). The right side of the index plane 96 is attached to the lower edge of an upright 94 by screws (not shown). The upper edge of the upright 94 is mounted to the right side of the cornice 90 by screws (not shown). The cornice 90 is drilled with an orifice 92 such that the orifice 92 is centered over the index plane 96 with labels showing a horizontal cross hair 102 and a vertical cross hair 104. The intersection of the horizontal cross hair 102 and the vertical cross hair 104 is the bull's-eye 100. Just outside the bull's-eye 100 is an outer ring 99. FIG. 14B shows an alternatively shaped orifice 92A as a possible aid for aiming.

Figure 15:
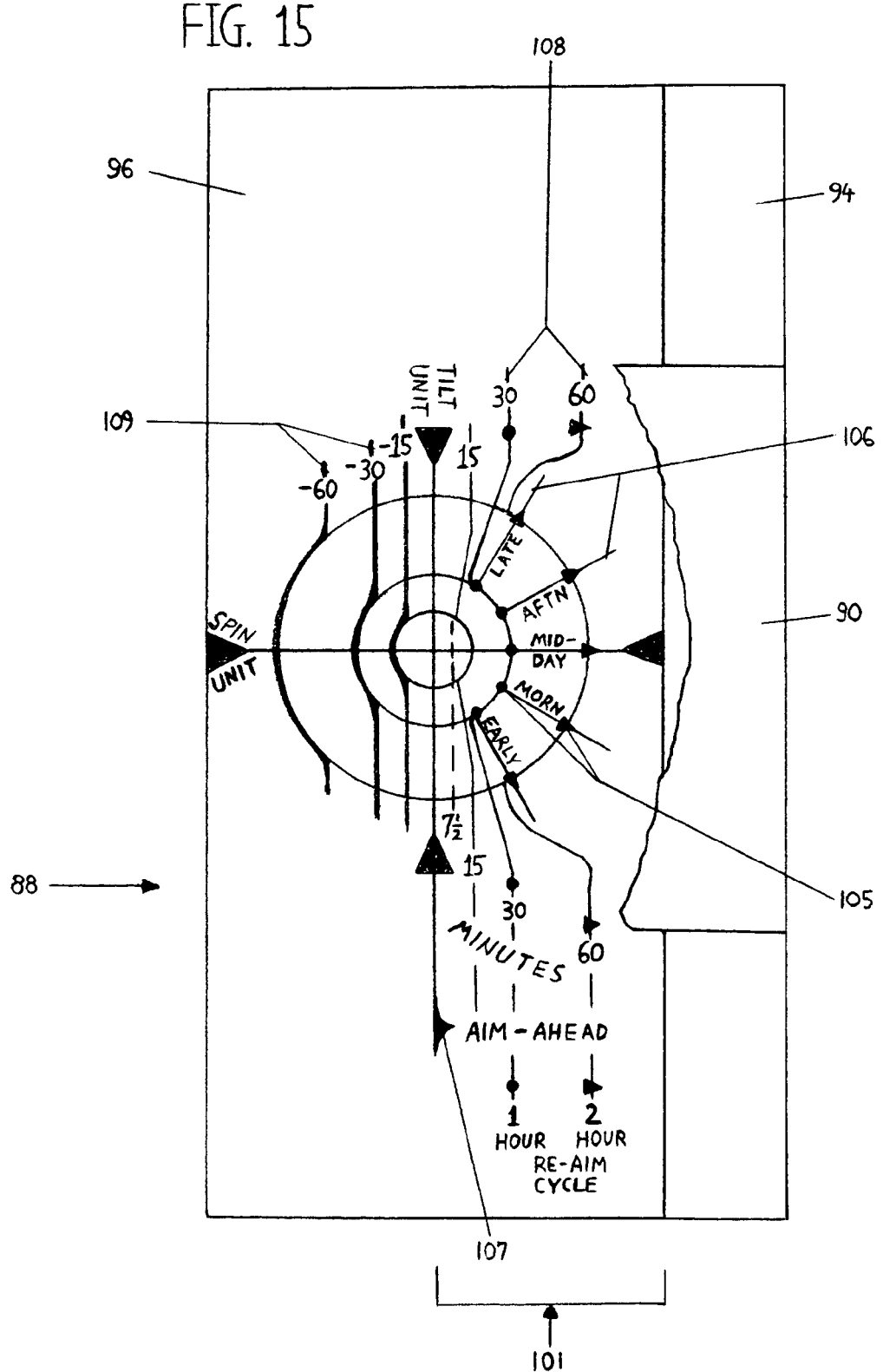
FIG. 15 is a plan view illustrating an unmounted aiming instrument index plane with detailed indicia labels and with the cornice broken-off for full visibility of the index plane indicia. Note: All part numbers lie outside the boundary of the index plane.

FIG. 15 shows a plan view of the index plane 96 with all indicia 97 labeling present and with the cornice 90 broken-off for maximum visibility. The horizontal cross hair 102 is labeled "SPIN UNIT" and the vertical cross hair 104 is labeled "TILT UNIT". There is a pointer near the operator's 0 end of the vertical cross hair 104 pointing to the right half of the index plane 96 known as an aim-ahead indicator 107. The aim-ahead indicator 107 is labeled "AIM-AHEAD" and brackets all aim-ahead indicia 101 shown in FIG. 15. The aim-ahead indicia 101 is comprised of several day segment tracks 106 and several aim-ahead minute marks 108. The day segment tracks 106 are located on the right half of the index plane 96 as viewed from the operator's 0 position, and lie on linear paths extending radially outward from the bull's-eye 100. The tracks 106 are labeled "EARLY", "MORN" (for morning), "MID-DAY" (midday), "AFTN" (afternoon), and "LATE". The day segment tracks 106 are chosen arbitrarily by the operator 0 and the actual time of day each track 106 is used can vary somewhat, depending on the season and/or latitude, due to the difference in the sun's angle. The aim-ahead minute marks 108 are labeled "7½", "15", "30", and "60", with a common label "MINUTES" indicated below the numerical values. The marks 108 are based on the fact that the sun moves 360 degrees per 24 hours relative to the surface of the earth, which equals 15 degrees per hour. This holds true regardless of season or latitude. The "60" minute (or one hour) mark 108 is located on the index plane 96 at an angle that is displaced 15 degrees longitudinally west of the bull's-eye 100 on the "MID-DAY" (or midday) track 106 as measured from the center of the orifice 92. From that point, designated with a small arrowhead, each point on the "60" mark 108 will be equidistant from the bull's-eye 100 and must necessarily lie on a circle. The other common aiming points on the "60" mark 108 are intercepts of the tracks 106 and are also designated by arrowheads. Each of the "30" mark 108 points will be equidistant at exactly one-half the distance (or displaced 7½ degrees) from the bull's-eye 100 and lie on a smaller concentric circle inside the "60" circle. The "30" mark 108 intercepts are designated by dots. All common aiming points designated with either arrowheads or dots are collectively known as common intercepts 105. On the left half of the index plane 96, as viewed from the operator's 0 position, are the past minute marks 109. The marks 109 are labeled "−15", "−30", and "−60", with the negative sign designating past-aim and with the numbers designating minutes.

FIG. 16A shows the adaptor box 110 which is comprised of a body 112, the aperture 114, a female flange 116, and a plurality of latch assemblies 120. The body 112 is constructed dimensionally to fill the cradle assembly 70, and to rise above the assembly 70 on a parallel plane. The female flange 116 is attached to the upper perimeter of the body 112 by screws (not shown). The latch assemblies 120 are attached at a predetermined distance from each other, and are mounted on the outer edges of the female flange 116 by screws (not shown). The aperture 114 is located in the center of the back of body 112 at a predetermined distance to allow the device lock-arm 82 of the cradle assembly 70 to lock the adaptor box 110 to the control apparatus 30.

FIGS. 16B and 16C show two different views of the interchange mount 122, which is comprised of a male flange 124, at least one extendable surface 126, and a plurality of latching protrusions 128. The male flange 124 is attached to the underside of the extendable surface(s) 126 by screws (not shown). The latching protrusions 128 are attached to the outside edges of the extendable surface 126, at a predetermined distance apart, on both sides of the interchange mount 122 by screws (not shown). The male flange 124 of the mount 122 slips into the flange 116 of either the adaptor box 110 or the second embodiment (as discussed later). The latching protrusions 128 of the mount 122 can then be engaged by the latch assemblies 120 of either the adaptor box 110 or the second embodiment. FIG. 16D shows a plurality of different mounting kits 130A, 130B, and 130X, for attaching various solar devices to the upper surface of the interchange mount 122. Some solar devices will mount in their entirety directly to mount 122, while others will require removing the upper usable section from the original factory base. The chosen solar device can then be utilized by the control apparatus 30 or the second embodiment. FIG. 16E shows a fixed-angle solar device 224 fastened to a mount 122 that can be utilized by either the control apparatus 30 or the second embodiment.

Operation—FIGS. 2 T*hrough* 16E

The operator 0 must make a few decisions prior to using the control apparatus 30 on any given day, especially regarding the weather as well as the amount of daylight available. The most important weather variables are the intensity of sunlight and the general level of cloudiness, if any. In addition, the stability of the weather must be ascertained. Assuming that the weather and sunlight are satisfactory, the operator 0 should decide whether or not to use the utility cart 140. If the control apparatus 30 is already set up on the utility cart 140, or if the location has many shade trees or other barriers to sunlight, then the cart 140 should be used. Other considerations include choosing the best solar device available to perform the task(s) required and perhaps which task has the highest priority.

Assuming that the control apparatus 30 is disassembled into subassemblies, and will be used with the utility cart 140, the following steps are required for assembly as well as the installation of a solar device.

The operator 0 should place the bare utility cart 140 on level ground, preferably without the removable handle 148 in place, for ease of access. The cam-locks 38 located on the deck 146 are twisted by the operator 0 to the open position, as shown in FIG. 10C, to receive the turntable 46. The operator 0 then places the turntable 46 on the deck 146 of the cart 140. The locator dowels 34 will automatically spot the turntable 46 onto the proper location of the deck 146, as shown in FIGS. 2 and 10B. Once the turntable 46 is placed, the operator 0 twists the cam-locks 38 one-half turn to lock the turntable 46 to the utility cart 140, as shown in FIG. 10B. The operator 0 then turns the rotor channel 52 shown in FIG. 7, of the turntable 46, to the most accessible position to accept the main body 54. The main body 54 also includes the cradle assembly 70, the biaxial control arm 74, and the aiming instrument 88. The operator 0 then places the main body 54 onto the turntable 46, so that the base channel 56 of the main body 54 fits inside the rotor channel 52 and interlocks as shown in FIG. 8B. The operator 0 then turns the control apparatus 30 to the easiest position for placement of a device within. This is done by the operator 0 leveling the arm 74 and swinging open the device lock-arm 82, as shown in FIG. 5. Either a direct-fit solar device 226, shown in FIG. 3, or an adaptor box 110, shown in FIG. 16A, may be placed into the cradle assembly 70. The operator 0 then closes the lock-arm 82, shown in FIG. 12A, to pin the device 226 or the box 110 to the control apparatus 30. If the operator 0 installs the box 110, then a solar device that is fastened to an interchange mount 122 must be installed, or the operator 0 must first fasten the solar device to the mount 122. The operator 0 can accomplish this by using a device mounting kit 130A, 130B, or 130X, as shown in FIG. 16D.

FIGS. 2, 12B, 13, and 16E, show the mounted parabolic cooker 220, the mounted photovoltaic array 228, the generic mounted solar device 222, and the mounted fixed-angle solar device 224, respectively, among many device options. To install the chosen mounted device to the adaptor box 110, the operator 0 lifts the device up over the empty adaptor box 110 and aligns the male flange 124 of mount 122 (attached to the bottom of the device) with the female flange 116 that forms the top of the box 110. The operator 0 then allows the flange 124 to drop into the flange 116, which holds and centers the device until it is latched in. As shown in FIGS. 16A, 16B, and 16C, the operator 0 then twists the latch assemblies 120 of the box 110 to engage the latching protrusions 128 of the mount 122, thus locking the device in.

As shown in FIGS. 11A and 11B, the removable handle 148 is installed by aligning it with both handle stays 150, on the utility cart 140, and allowing the handle 148 to slide down and bottom-out on the deck 146 of the utility cart 140.

To place the control apparatus 30 into operation, the operator 0 must push the utility cart 140 mounted control apparatus 30, loaded with the chosen solar device, to a sunny location. Once at the location, the operator 0 should quickly glance up at the sun to note any possible future barriers to sunlight for the next few hours or so, by extrapolating the sun's likely path. Once a suitable site is found, the controlled solar device may be loaded with the target product(s), or may need to be preheated prior to loading by aiming the device at the sun until the predetermined starting temperature is achieved.

Prior to aiming the device, the method of aiming must be chosen. Such variations include stationary placement, intentional off-aiming, direct aiming, and the aim-ahead method of aiming. For stationary placement, a solar device is usually placed for maximum solar exposure during the middle part of the day, and is usually not re-aimed for the duration of the task. Intentional off-aiming is used for simmering or warming and is equivalent to low temperature stove settings, as discussed later. Direct aiming of the device is easily accomplished by using the control apparatus 30 and pointing the aiming instrument 88 at the sun, and using the indicia shown in FIG. 14A, at predetermined intervals. Direct aiming is best used for preheating the device or when the operator 0 is present to tend or constantly coax the device by re-aiming perhaps due to time or weather constraints. The aim-ahead method is the positioning of the instrument 88 (along with the device), ahead of the sun's projected path of travel. The aim-ahead method uses the indicia shown in FIG. 15, and will be discussed later, as will the direct aiming method.

The theory behind the aiming instrument 88 is similar to that of the sundial, but with two main differences. One difference is that the instrument 88 utilizes an "inverted gnomen", shown in FIG. 14A. That is, instead of the sun shining on a protruding peg or other shape that casts a shadow, an orifice 92 located on the cornice 90 of instrument 88 allows a beam of sunlight to pass through and to shine onto the index plane 96 below. Another difference is that instead of resting in a fixed location and indicating the time of day like the sundial, instrument 88 is reset (re-aimed) throughout the day. This means that as the sunbeam crosses the indicia 97 of the index plane 96, the sunbeam will reach a known end point. The end of any particular aiming interval dictates that it is time to reposition instrument 88, which simultaneously repositions the solar device, for another aiming interval. This requires the operator 0 to grasp the control handle 76 and nutate the biaxial control arm 74 as needed to reposition instrument 88 to the desired position. The solar device is at optimal aim when the sunbeam is centered on the instrument 88 bull's-eye 100, shown in FIGS. 14A and 15.

The advantage of the aim-ahead method of aiming (indicia shown in FIG. 15), is best explained by the fact that if the solar device is directly aimed at the sun with the instrument 88 showing the sunbeam in the bull's-eye 100 at say, each hour, then the device will be going out of aim for the entire hour afterward. But if instead, the instrument 88 is aimed-ahead by 30 minutes, then the device, along with the sunbeam shining on the index plane 96, will be coming into aim for the first 30 minutes, followed by spot-on aim as the sunbeam crosses over the bull's-eye 100, and then going out of aim only during the last 30 minutes. Thus, a higher peak temperature is attained within the device or target product, as well as a higher ending temperature after one hour. Therefore, a net energy gain (or energy gathering ability) by the device has been achieved. The same reasoning holds true for other intervals as well.

To operate the control apparatus 30, the operator 0 grasps the control handle 76 as shown in FIG. 4, and swings the biaxial control arm 74 around in a horizontal plane parallel to the ground as needed until the operator 0 is facing directly toward the sun. The operator then simultaneously watches the index plane 96, while moving the arm 74 in a mostly vertical direction until the sunbeam shines through the orifice 92 and appears on the index plane 96. The operator 0 then nutates the arm 74 until the sunbeam is centered directly in the bull's-eye 100. The aiming instrument 88 and the controlled solar device is now directly and precisely aimed. At this point the operator 0 should note if the tilt pivots 59 need adjustment. If the cradle assembly 70 is too loose and fails to remain aimed, then the operator 0 must turn one or both of the pivot tensioner handles 60, shown in FIGS. 5 and 6, clockwise to tighten the tilt pivots 59. If the arm 74 feels springy, then the operator 0 must relax the tension on both tilt pivots 59 by turning handle 60 counterclockwise to loosen the tilt pivots 59 and then readjust as needed by turning both handles 60 clockwise to retighten the tilt pivots 59. The operator 0 can then re-aim the apparatus 30, centering the sunbeam in the bull's-eye 100 position. From this point, the operator 0 can re-aim as needed or use the aim-ahead feature described below.

Starting from the previously aimed position with the sunbeam shining on the index plane 96 and centered in the bull's-eye 100, to use the aim-ahead feature, shown in FIG. 15, the operator 0 initially must make two decisions. The operator 0 first selects a day segment track 106, which may be roughly based on the perceived position of the sun in the sky or the time of day. The operator 0 may choose one of the five featured tracks 106 indicated on the index plane 96, or may choose a track 106 that lies between, or even beyond, the five featured tracks 106. Next, the operator 0 selects an aiming interval and then divides the interval by two. (For example, if the chosen interval is 60 minutes, then the amount of aim-ahead will be 30 minutes.) The calculated value will lie on or between, or possibly beyond, the aim-ahead minute marks 108. The operator 0 then grasps the control handle 76 and nutates the biaxial control arm 74 until the center of the sunbeam, shining on the index plane 96, is at the intersection of the chosen track 106 and the chosen mark 108. The aim-ahead method is now complete. If the selected track 106 and mark 108 intersection falls on either a darkened dot or arrowhead, the intersection is known as a common intercept 105. All common intercepts 105 fall on either the "30" or "60" mark 108, indicating that either a one-hour or two-hour aiming interval is being used. Having completed the aim-ahead method, the operator 0 waits for the completion of the entire interval prior to re-aiming. At this point, the operator 0 will re-select track 106, as needed throughout the day, and may or may not adjust the interval and corresponding mark 108.

If full power is not desired for certain tasks such as warming or simmering, then intentional off-aiming may be used. The operator 0 may simply let the solar device get further out of focus on its own, as the day progresses, or may to decide to re-aim occasionally. By aiming the sunbeam at the past minute marks 109, shown in FIG. 15, full power will not be available since the sunbeam shining on the index plane 96 never crosses the bull's-eye 100. The minimum amount of re-aiming necessary may be determined by watching the target product(s) and/or monitoring the internal temperature of the device if it is equipped with a thermometer. Intentional off-aiming may also be used with the photovoltaic array 228 shown in FIG. 12B, to adjust the maximum amount of power received by solar powered appliances such as fans. This is done by changing the angle that the sunlight strikes the array 228, thus limiting the maximum power, and forming a "solar rheostat" of sorts.

Other considerations for operating the control apparatus 30 include monitoring the sun's path occasionally and relocating the apparatus 30 as needed due to shade encroachment. If the utility cart 140 is being used, the operator 0 simply relocates the unit and re-aims, which should only take a minute or two, at most. The utility cart 140 includes a handy folding table 131, as shown in FIGS. 2 and 11A, that is useful for loading or unloading the target products used in some of the solar devices. The removable handle 148 on the cart 140 may be instantly removed as shown in FIG. 11A, if the handle 148 should happen to get in the way and the operator 0 doesn't wish to reposition the cart 140. The table 131 will also be removed when the handle 148 is, but there are ample flat surfaces on the cart 140 that can be utilized, if needed. A handy storage compartment is available in the top of base channel 56.

Other useful options include using a 60-minute timer as an audio warning that it may be time to re-aim or check the target products. Also useful is an outdoor thermometer for checking the ambient temperature and possibly recording it. A data collection pad and pen is also recommended for recording the date, recipe, operation performed, the solar device used, the operating and ambient temperatures, starting and ending times, the weather changes encountered, the aiming interval, the results, etc.

FIGS. 16B Through 17B—Second Embodiment

The second embodiment is a no-tilt solar device apparatus 170 that is comprised of four legs 172, a female flange 116, a plurality of latch assemblies 120, and at least one notched top member 174. The top member is mounted perpendicular to the legs 172 with one leg 172 fitting into each notch near each corner of the apparatus 170. Each leg 172 forms a flush fit with the upper surface of the top member 174, and is mounted to the edge of the top member 174 by screws (not shown). The top members 174 straddle the female flange 116, that is centered in both dimensions, and the upper surface of the female flange 116 is flush with the upper surface of the top members 174. The female flange 116 is mounted to the top members 174 by screws (not shown). The latch assemblies 120 are attached to the two exposed outer edges of the female flange 116 at predetermined distances by screws (not shown), and are positioned to engage the latching protrusions 128 located on the outer edges of an interchange mount 122. The female flange 116 has predetermined inner dimensions allowing the insertion of a male flange 124 of the interchange mount 122, as shown in FIGS. 16B and 16C. The mount 122 has extendable surfaces 126 that allows the mounting of various solar devices, including those that require no tilting during use, such as a fixed-angle solar device 224 shown in FIG. 16E. The device 224 is mounted to the upper surface of the mount 122 by using a mounting kit such as 130A, 130B, or 130X, as represented by FIG. 160.

Figure 17A:
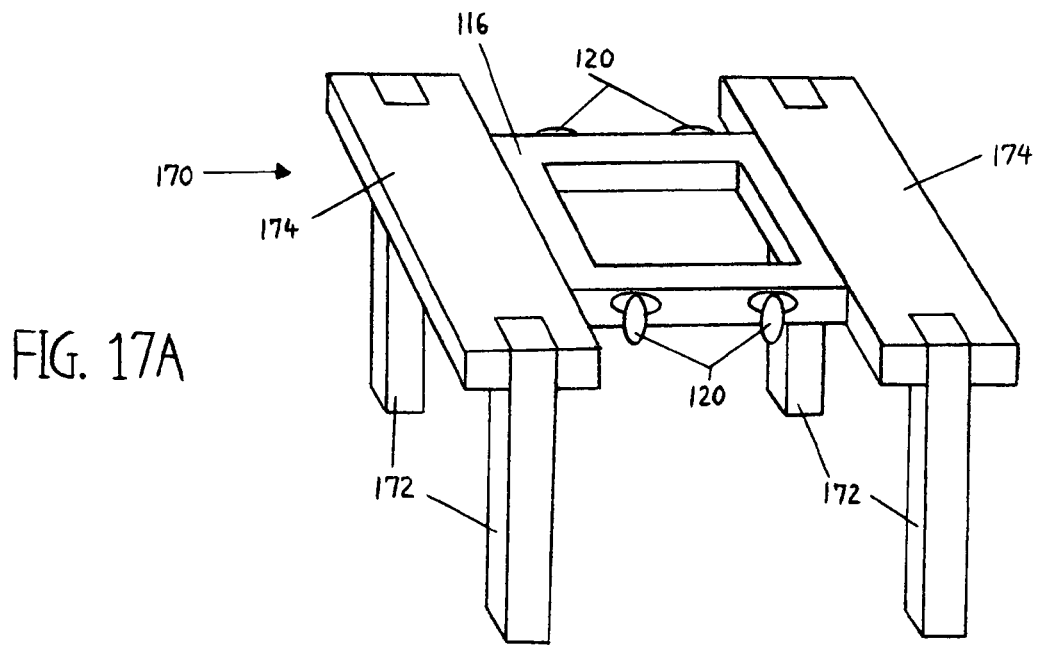
FIG. 17A is an elevated perspective view of a no-tilt solar device apparatus alternative embodiment.
Figure 17B:
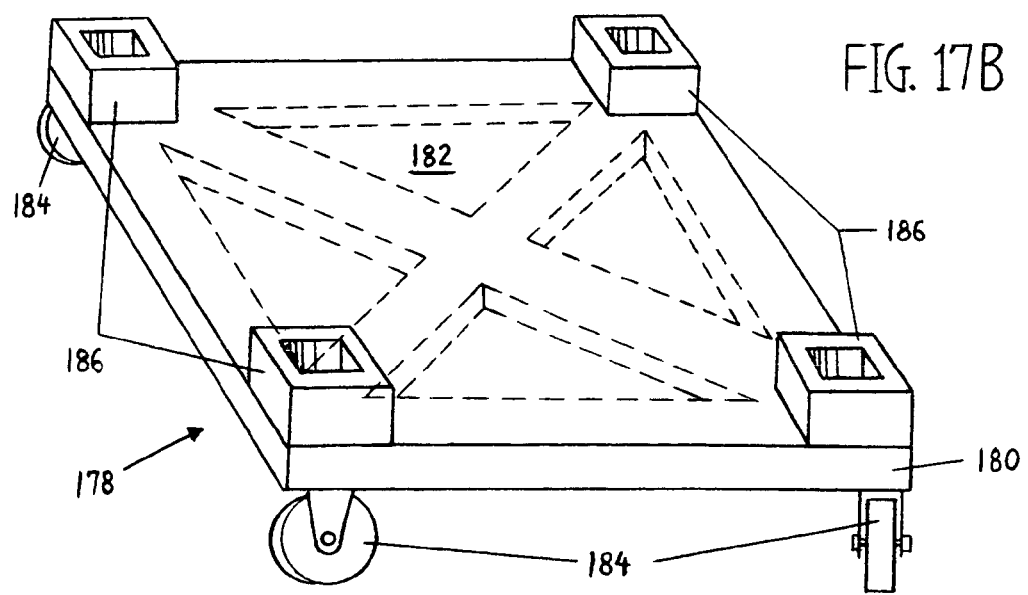
FIG. 17B is an elevated perspective view of a caster cart assembly for a no-tilt solar device apparatus.

FIG. 17B is a perspective view from above of an optional caster cart 178 for the second embodiment only, and is comprised of a frame 180, a deck 182, a plurality of swivel casters 184, and four leg insert stays 186. The basic structure of frame 180 is shown by the hidden lines in FIG. 17B. The deck 182 is attached to the frame 180 by screws (not shown). The swivel casters 184 are attached to the frame 180 at each corner by lag screws 143 (not shown), with each screw 143 fitted with a conventional lock washer 145 (not shown). The leg insert stays 186 are attached through the deck 182 and into the frame 180 by screws (not shown). The four leg insert stays are located at a predetermined distance apart, and are loose fitting for easy insertion of the four legs 172 of the no-tilt solar device apparatus 170.

Operation—FIGS. 16B Through 17B

The second embodiment is for use with solar devices that require no vertical adjustment, such as those that have fixed-angle glazing. Included in this group are solar water distillers and solar food dehydrators, among others. A device that doesn't require tilt is shown in FIG. 16E. When such devices are mounted onto an interchange mount 122, they will fit either embodiment, although it's best to use the second embodiment to keep from tying up the higher-end first embodiment.

The no-tilt solar device apparatus 170 of FIG. 17A may be used as shown with a device such as the fixed-angle solar device 224, shown in FIG. 16E. Such a set-up would be best utilized by using the stationary aiming method and possibly used long-term when repositioning isn't often necessary. Both aiming and mobility are greatly improved with the use of the optional caster cart 178. To install the apparatus 170 onto the caster cart 178, shown in FIG. 17B, the operator 0 simply lifts the empty assembly 170 up and inserts the four legs 172 into the four leg insert stays 186 of the caster cart 178. The inserted legs 172 interlock with the stays 186, that are mounted to the deck 182 of the caster cart 178.

To install a solar device that has been previously mounted to an interchange mount 122 by using a device mounting kit, such as a 130A, 130B, or 130X, represented by FIG. 16D, the operator 0 aligns the male flange of mount 122, with the female flange 116 that forms the central section of the apparatus 170. The operator 0 then allows the male flange 124 to drop into the female flange 116, which holds and centers the device until it can be latched in. The operator 0 then twists the latch assemblies 120 of the apparatus 170 shown in FIG. 17A, to engage the latching protrusions 128 of the mount 122 shown in FIGS. 16B and 16C, locking the device in.

The apparatus 170, furnished with the optional caster cart 178, and equipped with a chosen solar device, is now ready to be rolled to a sunny location. The operator 0 must first determine if the weather, the quality of sunlight, and the quantity of remaining daylight are sufficient to warrant use on any particular day. If so, the chosen solar device is loaded with any needed target product(s) and the solar device controlled by the apparatus 170 is ready to be aimed toward the sun. To aim the previously mentioned combination, the operator 0 stands at the back of the solar device and grasps both sides of either the device or the apparatus 170. The operator 0 then turns the entire unit by spinning the caster cart 178 on its axis until the operator 0 is facing toward the sun. At this point, the sun should be centered over the centerline of the device, as viewed from the rear, and is perfectly aimed on the horizontal plane. The apparatus 170, when used with the caster cart 178, can also employ an approximate aim-ahead method, by the operator 0 spinning the caster cart 178 on its axis, just a bit past perfect aim, so that the sun is centered over the left half of the solar device, as viewed from the rear. This will result in the shadow cast on the ground on the west side of the device to be elongated relative to the shadow cast on the east side. The operator 0 will re-aim as needed after the sun moves well beyond the centerline to the right side of the device, as viewed from the rear.

Useful optional equipment includes the same utensils previously listed with the first embodiment, such as a 60-minute timer, a thermometer, and a data collection pad and pen. There is also ample space for the addition of a storage bin underneath the no-tilt solar device apparatus 170 or on the deck 182 of the caster cart 178.

CONCLUSION, RAMIFICATIONS, AND SCOPE

Accordingly, the reader will see that I have provided an improved apparatus for supporting and controlling solar devices. Provided also is a mounting system that converts various solar devices from different manufacturers by using a standardized interchange mount 122 so that the devices can be exchanged and controlled in a common manner by using either embodiment. Also provided for the first embodiment, is an improved instrument for aiming solar devices, that provides a net energy gain per aimed interval due to the quicker, more precise, and more effective aiming of the chosen solar device. Even more energy gain is made possible by the wide-range vertical sweep of the control apparatus 30. Using and aiming any solar device requires much less effort as a result of the quick and simultaneous adjustment in both dimensions. Optional carts for both embodiments provide mobility for aiming and shade avoidance.

While the above description contains many specificities, these should not be construed as limitations on the scope of the invention, but rather as exemplifications of the preferred embodiments thereof. Many other variations are possible. For example, the entire apparatus can be made in a lightweight portable form. Different materials, sizes, and interconnections can be used for all components. The biaxial control arm 74 can be extended or an extension kit made for use with larger solar devices. The utility cart 140 could be made longer or wider to hold two or more apparatuses, thus forming a solar range. The orifice 92 could be changed to any of several different shapes, such as the orifice 92A, to aid in the aiming process. The aiming instrument 88 could be mounted onto a separate solar device or used with an entirely different system to aid in aiming. The apparatus 30 and aiming indicia 97 could be converted for operation in the southern hemisphere.

Accordingly, the scope of the invention should be determined not by the embodiments illustrated, but by the appended claims and their legal equivalents.

I claim:

1. A solar device control apparatus with device interchangeability, said apparatus comprising:
 a) a turntable with a rotor channel with said rotor channel being mounted with channel legs pointed upward and mounted both slidably and rotatably to a lower fixed section of said turntable known as the stator;
 b) a base channel secured between two uprights with said base channel being mounted with channel legs pointed upward and interlocking with said rotor channel;
 c) a cradle assembly for supporting either a solar device or an adaptor box with said cradle assembly being positioned between said uprights and pivotably mounted to said uprights so that the tilt of said cradle assembly can be adjusted, with each said upright supporting a pivot tensioner handle that is individually adjustable by hand;

d) a device lock-arm hingedly secured to the back of said cradle assembly with said device lock-arm provided with locking means for engaging an aperture in either said solar device or said adaptor box at a predetermined point;

e) a biaxial control arm secured to a back member of said cradle assembly, either on the same plane or a parallel plane with the upper surface of said cradle assembly, and mounted such that movement of said biaxial control arm adjusts the orientation of said cradle assembly and contents thereof biaxially simultaneously;

whereby said apparatus may be adjusted on both axes simultaneously by a slight urging of said biaxial control arm.

2. The apparatus of claim 1 further including an aiming instrument for aiming said apparatus with said solar device installed, said aiming instrument comprised of a piece of channel-shaped material with the channel laid over on one leg and secured to said biaxial control arm on either the same plane or a parallel plane capable of maximizing the energy gathering ability of said solar device, an orifice of predetermined size and shape machined through the upper channel leg known as a cornice and centered using predetermined dimensions, indicia for a vertical cross hair and a horizontal cross hair with the intersection thereof known as a bull's-eye, with said bull's-eye placed below said orifice on the inside surface of the lower channel leg known as an index plane.

3. The apparatus of claim 2 further including an adaptor box comprised of a body to both fit into and rise above the upper surface of said cradle assembly on a parallel plane, an aperture in said body at a predetermined location allowing the engagement of said device lock-arm, a female flange located around the top inside and outside perimeter of said body, and a plurality of latch assemblies mounted on the outside edges of said female flange at predetermined distances apart.

4. The apparatus of claim 3 further including an interchange mount comprising at least one extendable surface of predetermined width, a male flange of predetermined dimensions secured to said extendable surface, a plurality of latching protrusions secured at predetermined dimensions on opposite edges of the width of said extendable surface, and a plurality of different mounting kits to attach various said solar devices to said extendable surface of said interchange mount.

5. A solar device control apparatus with device interchangeability, said apparatus comprising:

a) a turntable with a rotor channel with said rotor channel being mounted with channel legs pointed upward and mounted both slidably and rotatably to a lower fixed section of said turntable known as the stator;

b) a base channel secured between two uprights with said base channel being mounted with channel legs pointed upward and interlocking with said rotor channel;

c) a cradle assembly for supporting either a solar device or an adaptor box with said cradle assembly being positioned between said uprights and pivotably mounted to said uprights so that the tilt of said cradle assembly can be adjusted, with each said upright supporting a pivot tensioner handle that is individually adjustable by hand;

d) a device lock-arm hingedly secured to the back of said cradle assembly with said device lock-arm provided with locking means for engaging an aperture in either said solar device or said adaptor box at a predetermined point;

e) a biaxial control arm secured to a back member of said cradle assembly, either on the same plane or a parallel plane with the upper surface of said cradle assembly, and mounted such that movement of said biaxial control arm adjusts the orientation of said cradle assembly and contents thereof biaxially simultaneously;

f) an aiming instrument comprised of a piece of channel-shaped material with the channel laid over on one leg and secured to said biaxial control arm on either the same plane or a parallel plane capable of maximizing the energy gathering ability of said solar device, an orifice of predetermined size and shape machined through the upper channel leg known as a cornice and centered using predetermined dimensions, indicia for a vertical cross hair and a horizontal cross hair with the intersection thereof known as a bull's-eye, with said bull's-eye placed below said orifice on the inside surface of the lower channel leg known as an index plane;

whereby said apparatus with said solar device installed can be immediately aimed and adjusted on both axes by a single movement.

6. The apparatus of claim 5 further including said aiming instrument having a plurality of labeled day segment tracks located on the upper surface of said index plane at predetermined locations as points on a circular arc and lying in straight lines radiating outward from said bull's-eye, with said day segment tracks being named per each portion of the day.

7. The apparatus of claim 6 further including said aiming instrument having a plurality of labeled aim-ahead minute marks spaced at predetermined distances from said bull's-eye, and lying either in the vertical direction or as points on a circular arc on the right half of the upper surface of said index plane as viewed from the operating position.

8. The apparatus of claim 7 further including said aiming instrument having a plurality of labeled past minute marks spaced at predetermined distances from said bull's-eye and lying either in the vertical direction or as points on a circular arc on the left half of the upper surface of said index plane as viewed from the operating position.

9. The apparatus of claim 8 further including a utility cart comprised of a deck secured to a rigid underside frame having predetermined dimensions, at least two swivel casters secured to the front corners of said frame, two wheels secured to an axle mounted near the rear of said utility cart with said axle passing laterally through the members of said frame, two slotted handle stays located near the rear of said utility cart and mounted to said frame, and a removable handle that slidably engages said handle stays until contacting said deck of said utility cart.

10. The apparatus of claim 9 further including a plurality of cam-lock mechanisms secured to said deck of said utility cart and rotatably engaging said turntable by sandwiching a number of stabilizer spokes of said turntable to said deck, and a plurality of locator dowels underlying said cam-lock mechanisms and located at predetermined positions on said deck to automatically center said turntable onto said utility cart.

11. The apparatus of claim 10 further including a folding table hingedly attached to said removable handle of said utility cart, such that when folded up said folding table rests against said removable handle, and when folded down said folding table rests in a horizontal position parallel to said deck of said utility cart.

12. The apparatus of claim 11 further including an adaptor box comprised of a body to both fit into and rise above the upper surface of said cradle assembly on a parallel plane, an aperture in said body at a predetermined location allowing the engagement of said device lock-arm, a female flange located around the top inside and outside perimeter of said body, and a plurality of latch assemblies mounted on the outside edges of said female flange at predetermined distances apart.

13. The apparatus of claim 12 further including an interchange mount comprising at least one extendable surface of predetermined width, a male flange of predetermined dimensions secured to said extendable surface, a plurality of latching protrusions secured at predetermined dimensions on opposite edges of the width of said extendable surface, and a plurality of different mounting kits to attach various said solar devices to said extendable surface of said interchange mount.

14. The apparatus of claim 13 wherein said aiming instrument has an orifice shaped like a plus sign that is turned forty-five degrees from vertical, so that the narrow vertices of said orifice are intersected by said vertical cross hair and said horizontal cross hair when placed at said intersection thereof.

* * * * *